United States Patent
Turner et al.

(10) Patent No.: US 12,520,260 B2
(45) Date of Patent: Jan. 6, 2026

(54) TIME SYNCHRONIZING A WIRELESS COMMUNICATION DEVICE AND A PERIPHERAL DEVICE BASED ON ONE OR MORE ACCESS POINTS

(71) Applicant: QUALCOMM Incorporated, San Diego, CA (US)

(72) Inventors: Richard Turner, Belfast (GB); Laurent Wojcieszak, Belfast (GB); Richard Cardoe, Fen Drayton (GB); Sriman Miryala, Hyderabad (IN); Debashis Dutt, San Jose, CA (US); Derrick Rea, Broughshane (GB); Ganesh Babu Kumaravel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 18/453,976

(22) Filed: Aug. 22, 2023

(65) Prior Publication Data
US 2025/0071703 A1 Feb. 27, 2025

(51) Int. Cl.
*H04W 56/00* (2009.01)
*H04W 84/12* (2009.01)

(52) U.S. Cl.
CPC ........ *H04W 56/0015* (2013.01); *H04W 84/12* (2013.01)

(58) Field of Classification Search
CPC .......................... H04W 56/0015; H04W 84/12
(Continued)

(56) References Cited

U.S. PATENT DOCUMENTS

2013/0034004 A1* 2/2013 Mannemala ...... H04W 52/0216
370/252
2014/0314068 A1* 10/2014 Wentink ................ H04W 56/00
370/350
(Continued)

FOREIGN PATENT DOCUMENTS

WO 2023069144 A1 4/2023
WO 2023146565 A1 8/2023

OTHER PUBLICATIONS

International Search Report and Written Opinion—PCT/US2024/039792—ISA/EPO—Nov. 21, 2024.

*Primary Examiner* — Robert J Lopata
(74) *Attorney, Agent, or Firm* — Harrity & Harrity, LLP

(57) ABSTRACT

Various aspects of the present disclosure generally relate to wireless communication. In some aspects, a peripheral device may synchronize a local clock to an access point timing synchronization function clock (TSF_AP) that is maintained by an access point (AP) connected to the peripheral device. The peripheral device may maintain, based at least in part on the local clock, an estimated time-to-play timing synchronization function clock (TSF_est) that is associated with outputting user data. The peripheral device may receive, from the AP, timing synchronization information that is based at least in part on a comparison between a wireless communication device (WCD) time-to-play timing synchronization function software clock (TSF_soft) and the TSF_est. The peripheral device may output the user data based at least in part on the TSF_est and the timing synchronization information. Numerous other aspects are described.

30 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0344490 A1 | 11/2014 | Tsfaty et al. | |
| 2018/0049130 A1* | 2/2018 | Huang | H04W 52/0235 |
| 2020/0137699 A1 | 4/2020 | Girardier et al. | |
| 2024/0143269 A1* | 5/2024 | Li | H04W 56/00 |
| 2024/0397399 A1* | 11/2024 | Gupta | H04W 36/322 |
| 2025/0016701 A1* | 1/2025 | Campbell | H04L 65/4015 |
| 2025/0063495 A1* | 2/2025 | He | H04W 52/0216 |
| 2025/0106762 A1* | 3/2025 | Marwah | H04W 52/028 |

* cited by examiner

TIME SYNCHRONIZING A WIRELESS COMMUNICATION DEVICE AND A PERIPHERAL DEVICE BASED ON ONE OR MORE ACCESS POINTS

FIELD OF THE DISCLOSURE

Aspects of the present disclosure generally relate to wireless communication and to techniques and apparatuses for time synchronizing a wireless communication device and a peripheral device based on a link that uses one or more access points.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a peripheral device. The method may include synchronizing a local clock to an access point timing synchronization function clock (TSF_AP) that is maintained by an access point (AP) connected to the peripheral device. The method may include maintaining, based at least in part on the local clock, an estimated time-to-play timing synchronization function clock (TSF_est) that is associated with outputting user data. The method may include receiving, from the AP, timing synchronization information that is based at least in part on a comparison between a wireless communication device (WCD) time-to-play timing synchronization function clock (TSF_soft) and the TSF_est. The method may include outputting the user data based at least in part on the TSF_est and the timing synchronization information.

Some aspects described herein relate to a method of wireless communication performed by a WCD. The method may include maintaining a WCD TSF_soft that is associated with outputting user data at a peripheral device. The method may include calculating timing synchronization information that is associated with synchronizing the WCD TSF_soft and a TSF_est that is local to the peripheral device. The method may include transmitting, to an AP, a message that indicates the timing synchronization information and is addressed to the peripheral device.

Some aspects described herein relate to an apparatus for wireless communication at a peripheral device. The apparatus may include one or more memories and one or more processors coupled to the one or more memories. The one or more processors may be configured, individually or collectively, to synchronize a local clock to a TSF_AP that is maintained by an AP connected to the peripheral device. The one or more processors may be configured to maintain, based at least in part on the local clock, a TSF_est that is associated with outputting user data. The one or more processors may be configured to receive, from the AP, timing synchronization information that is based at least in part on a comparison between a WCD TSF_soft and the TSF_est. The one or more processors may be configured to output the user data based at least in part on the TSF_est and the timing synchronization information.

Some aspects described herein relate to an apparatus for wireless communication at a WCD. The apparatus may include one or more memories and one or more processors coupled to the one or more memories. The one or more processors may be configured, individually or collectively, to maintain a WCD TSF_soft that is associated with outputting user data at a peripheral device. The one or more processors may be configured to calculate timing synchronization information that is associated with synchronizing the WCD TSF_soft and a TSF_est that is local to the peripheral device. The one or more processors may be configured to transmit, to an AP, a message that indicates the timing synchronization information and is addressed to the peripheral device.

Some aspects described herein relate to a non-transitory computer-readable medium that stores a set of instructions for wireless communication by a peripheral device. The set of instructions, when executed by one or more processors of the peripheral device, may cause the peripheral device to synchronize a local clock to a TSF_AP that is maintained by an AP connected to the peripheral device. The set of instructions, when executed by one or more processors of the peripheral device, may cause the peripheral device to maintain, based at least in part on the local clock, a TSF_est that is associated with outputting user data. The set of instructions, when executed by one or more processors of the peripheral device, may cause the peripheral device to receive, from the AP, timing synchronization information that is based at least in part on a comparison between a WCD TSF_soft and the TSF_est. The set of instructions, when executed by one or more processors of the peripheral device, may cause the peripheral device to output the user data based at least in part on the TSF_est and the timing synchronization information.

Some aspects described herein relate to a non-transitory computer-readable medium that stores a set of instructions for wireless communication by a WCD. The set of instructions, when executed by one or more processors of the WCD, may cause the WCD to maintain a WCD TSF_soft that is associated with outputting user data at a peripheral device. The set of instructions, when executed by one or more processors of the WCD, may cause the WCD to calculate timing synchronization information that is associated with synchronizing the WCD TSF_soft and a TSF_est that is local to the peripheral device. The set of instructions, when executed by one or more processors of the WCD, may cause the WCD to transmit, to an AP, a message that indicates the timing synchronization information and is addressed to the peripheral device.

Some aspects described herein relate to an apparatus for wireless communication. The apparatus may include means for synchronizing a local clock to a TSF_AP that is maintained by an AP connected to the peripheral device. The apparatus may include means for maintaining, based at least in part on the local clock, a TSF_est that is associated with outputting user data. The apparatus may include means for receiving, from the AP, timing synchronization information that is based at least in part on a comparison between a WCD TSF_soft and the TSF_est. The apparatus may include means for outputting the user data based at least in part on the TSF_est and the timing synchronization information.

Some aspects described herein relate to an apparatus for wireless communication. The apparatus may include means for maintaining a WCD TSF_soft that is associated with outputting user data at a peripheral device. The apparatus may include means for calculating timing synchronization information that is associated with synchronizing the WCD TSF_soft and a TSF_est that is local to the peripheral device. The apparatus may include means for transmitting, to an AP, a message that indicates the timing synchronization information and is addressed to the peripheral device.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
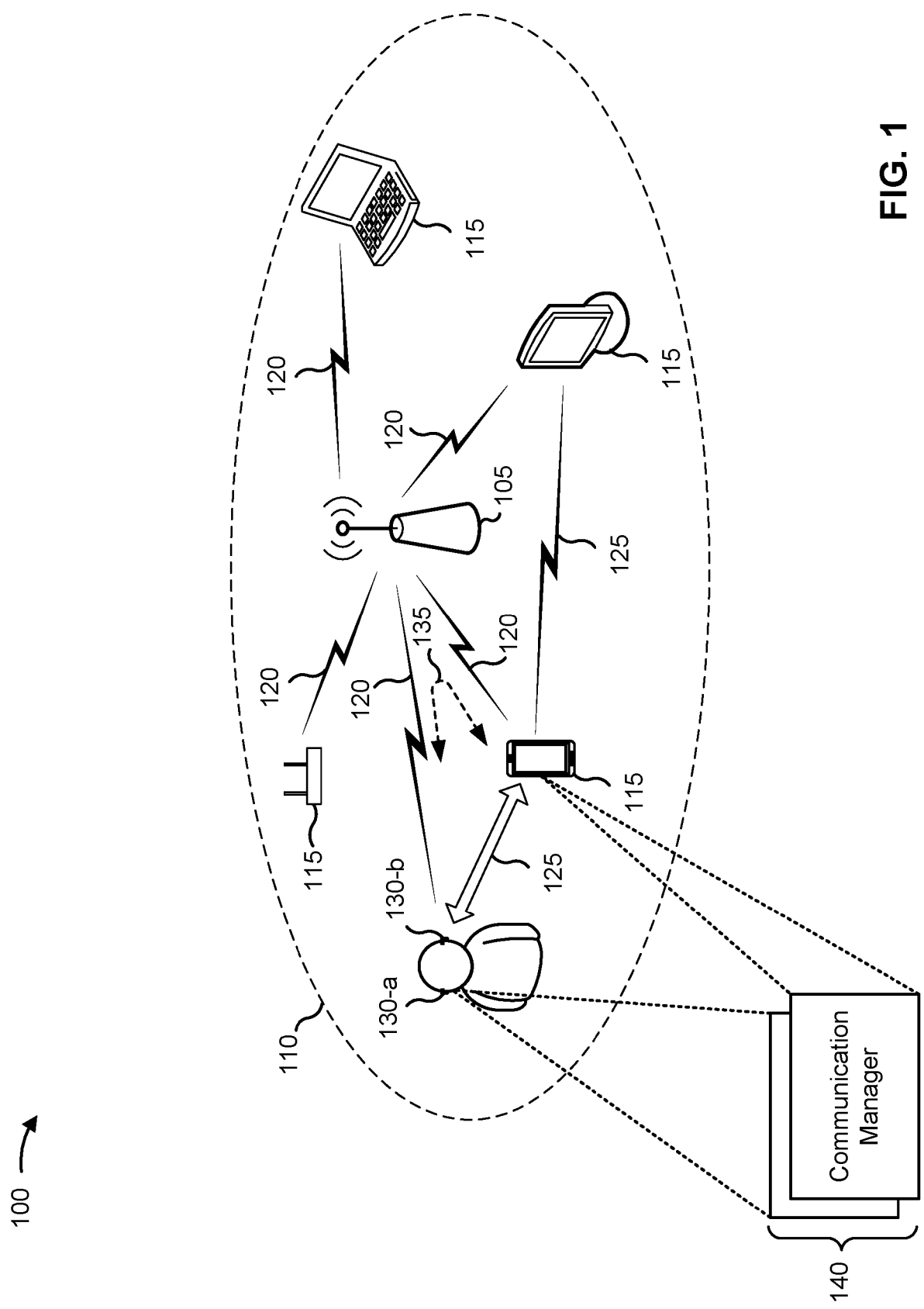
FIG. 1 illustrates a wireless communication system configured in accordance with the present disclosure.

In an extended personal area network (XPAN) a wireless communication device (WCD) may connect to a peripheral device (e.g., a wireless earbud) using an access point (AP) and/or a direct wireless link. The WCD and/or the peripheral device may sometimes use a battery as an energy source. One way to reduce power consumption and/or increase a duration of a battery life pertains to the device operating in a power saving mode that is associated with the device iteratively and/or periodically transitioning between an active state and a sleep state. While operating in a sleep state, the associated device may refrain from transmitting, receiving, and/or processing wireless communications. While operating in an active state, the associated device may transmit, receive, and/or process the wireless communications.

In some aspects, a time synchronization protocol, such as a precision timing protocol (PTP) that synchronizes clocks in a network, may be based at least in part on the various devices operating in an active mode. That is, the time synchronization protocol may fail to account for one or more of the devices transitioning between the active state and the sleep state, resulting in synchronization errors that exceed a threshold and/or degrade an audio playback quality. To illustrate, a first peripheral device (e.g., a first wireless earbud in a pair of wireless earbuds) may perform playback of audio samples that are misaligned in time with playback of the audio samples by a second peripheral device (e.g., a second wireless earbud in the pair of wireless earbuds) performing second playback of the audio samples. The use of APs to communicate the audio data may also result in increased synchronization errors between an audio source (e.g., a WCD) and an audio destination (e.g., a peripheral device) based at least in part on the multiple clock domains being involved in the communication. Asynchronous playback that exceeds a threshold and/or increased synchronization errors may be observable to a listener, may result in decreased audio playback quality, and/or may result in audio rendering errors, such as discontinuous playback (e.g., jumps).

Various aspects described herein generally relate to time synchronizing a WCD and a peripheral device based on a link that uses one or more access points. Some aspects relate more specifically to the WCD calculating time synchronization information that is based at least in part on a peripheral device pair (e.g., a first wireless earbud and a second wireless earbud, a first wireless speaker and a second wireless speaker, and/or a first headset and a second headset) being connected to, and/or synchronizing to, a common network clock. In some aspects, a peripheral device may synchronize a local clock to an AP timing synchronization function clock (TSF_AP) that is maintained by an AP connected to the peripheral device. To illustrate, the peripheral device may initialize and/or synchronize a first time base of the local clock at the peripheral device using a second time base that is associated with the TSF_AP. The peripheral device may maintain, based at least in part on the local clock, an estimated time-to-play timing synchronization function software clock (TSF_est) that is associated with outputting user data. Alternatively, or additionally, the peripheral device may be a first peripheral device in a peripheral device pair, and a second peripheral device in the peripheral device pair may synchronize to the AP (e.g., the same AP as the first peripheral device) such that a second local clock at the second peripheral device is based at least in part on the same AP as a first local clock at the first peripheral device. Some non-limiting examples of a peripheral device pair may include a first wireless earbud and a second wireless earbud, a first wireless speaker and a second wireless speaker, and/or a first headset and a second headset.

Alternatively, or additionally, the peripheral device pair may be included in a peripheral device group that includes two or more peripheral devices. As one example, a peripheral device group may include a first set of wireless earbuds, a second set of wireless earbuds, and a third set of wireless earbuds that are connected to a same WCD (e.g., as an audio source). As another example, a peripheral device group may include a first wireless speaker, a second speaker, and a third wireless speaker connected to a same WCD (e.g., as an audio source). Accordingly, aspects described herein with respect to a peripheral device pair may also be applied to a peripheral device group. In some aspects, the peripheral device (e.g., the first peripheral device) may receive, from the AP, timing synchronization information that is based at least in part on a comparison between a WCD time-to-play timing synchronization function clock (TSF_soft) and the TSF_est. That is, the timing synchronization information may indicate one or more timing metrics that may be used by the peripheral device to mitigate timing differences between the TSF_est and the WCD TSF_soft. In some aspects, the timing differences may be based at least in part on the WCD and the peripheral device being connected to different APs. Accordingly, the peripheral device may output user data based at least in part on the TSF_est and the timing synchronization information. To illustrate, the peripheral device may output audio data based at least in part on the TSF_est and the timing synchronization information.

In some aspects, a WCD may maintain a WCD TSF_soft that is associated with outputting user data at a peripheral device. As described below, the WCD may calculate timing synchronization information that is associated with synchronizing the WCD TSF_soft and a TSF_est that is local to the peripheral device. Based at least in part on calculating the timing synchronization information, the WCD may transmit, to an AP, a message that indicates the timing synchronization information and is addressed to the peripheral device. In some aspects, the peripheral device is a first peripheral device in a peripheral device pair, and the WCD may transmit, to the AP, a second message that indicates the timing synchronization information and is addressed to a second peripheral device of the peripheral device pair.

Each peripheral device in a peripheral device pair (and/or a peripheral device group) may connect to a same AP and use a clock and/or timing base associated with the AP (e.g., a TSF_AP) to initialize a respective, local clock at the peripheral device, such as a hardware clock. Alternatively, or additionally, each peripheral device in the peripheral device pair may maintain and/or synchronize a time-to-play (TTP) timing synchronization function (TSF) software clock, such as the TSF_est as described above, using the clock associated with the AP as a common network clock for each peripheral device. The use of the AP as a common network clock for each peripheral device in the peripheral device pair may enable synchronization between the peripheral devices without the peripheral devices performing a synchronization procedure together and/or independent of the peripheral devices operating in a sleep state. Alternatively, or additionally, each peripheral device synchronizing to the AP clock as a common clock may result in more robust and/or stable playback based at least in part on the use of a common network clock reducing a size of a skew between the peripheral devices (e.g., relative to the peripheral devices performing a synchronization procedure with one another). A reduced skew size may improve an audio playback quality.

In some aspects, the WCD may synchronize a WCD TSF_soft with a TSF_est at a peripheral device. For example, and as described below, the WCD may generate, based at least in part on one or more timing synchronization algorithms, timing synchronization information that mitigates timing alignment errors between the WCD and a peripheral device (e.g., the WCD TSF_soft and the TSF_est). Alternatively, or additionally, the timing synchronization information may enable each peripheral device to playback audio based at least in part on using a local clock at the peripheral device that is synchronized to the common network clock. Performing time synchronization with the AP, and/or using the timing synchronization information to adjust a playback time of audio, may mitigate time alignment errors between the WCD and a peripheral device and result in an increased audio playback quality by the peripheral device pair (e.g., audio playback with negligible timing differences and/or audio playback differences that are unnoticed by a listener).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a WCD may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (e.g., peripheral devices) of a user. In scenarios in which a user uses two peripheral devices, the wireless communication device may support an XPAN via which the wireless communication device may communicate with the two peripheral devices. To meet latency or lossless criteria associated with an application or use case, XPAN devices may employ a target wake time (TWT) technique for communication between the wireless communication device and the peripheral devices. Alternatively, or additionally, the WCD and the peripheral devices may communicate with one another via an AP as described below. To illustrate, the WCD and the peripheral devices may exchange high-fidelity audio user data and/or high-fidelity voice user data via the AP.

In some implementations, a WCD, which may be a handset or an AP (e.g., a soft AP (SAP)), and a set of peripheral devices (e.g., earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 illustrates a wireless communication system 100 (also known as a wireless local area network (WLAN) or a Wi-Fi network) configured in accordance with the present disclosure. The wireless communication system 100 may include an AP 105 and multiple associated devices 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a basic service set (BSS) or an extended service set (ESS). A BSS includes devices that communicate with each other, and an ESS may include multiple BSSs or one or more BSSs and associated wired networks. The various devices 115 in the network are able to communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple APs 105 to be connected in an ESS.

Although not shown in FIG. 1, a device 115 may be located in the intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission. Thus, RTS and/or CTS may help mitigate a hidden node problem.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipment (UEs), STAs, mobile stations, PDAs, other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc. As one example, the paired devices 115 may include a wireless earbud 130-a and a wireless earbud 130-b as shown by FIG. 1, and the paired devices 115 may alternatively or additionally communicate with the AP 105. In some aspects, a paired device 115 may communicate with a device 115 using the AP 105.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-orientated (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases, the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications and/or the AP 105). As one example, the device 115 may relay or pass the audio to the paired device 115 via the direct wireless communication link 125. Alternatively, or additionally, the device 115 may relay and/or pass the audio to the paired device via the AP 105 as shown by reference number 135. In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio to one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-*a* and a wireless earbud 130-*b*), the wireless communication device may support an XPAN via which the wireless communication device may communicate with the two peripheral devices.

In some aspects, a peripheral device (e.g., a device 115, a wireless earbud 130-*a*, and/or a wireless earbud 130-*b*) may include a communication manager 140. As described in more detail elsewhere herein, the communication manager 140 may synchronize a local clock to an access point timing synchronization function clock (TSF_AP) that is maintained by an AP connected to the peripheral device; maintain, based at least in part on the local clock, a TSF_est that is associated with outputting user data; receive, from the AP, timing synchronization information that is based at least in part on a comparison between a WCD TSF_soft and the TSF_est; and output the user data based at least in part on the TSF_est and the timing synchronization information. Additionally, or alternatively, the communication manager 140 may perform one or more other operations described herein.

In some aspects, a WCD (e.g., a device 115) may include a communication manager 140. As described in more detail elsewhere herein, the communication manager 140 may maintain a WCD TSF_soft that is associated with outputting user data at a peripheral device; calculate timing synchronization information that is associated with synchronizing the WCD TSF_soft and a TSF_est that is local to the peripheral device; and transmit, to an AP, a message that indicates the timing synchronization information and is addressed to the peripheral device. Additionally, or alternatively, the communication manager 140 may perform one or more other operations described herein.

As indicated above, FIG. 1 is provided as an example. Other examples may differ from what is described with regard to FIG. 1.

Figure 2:
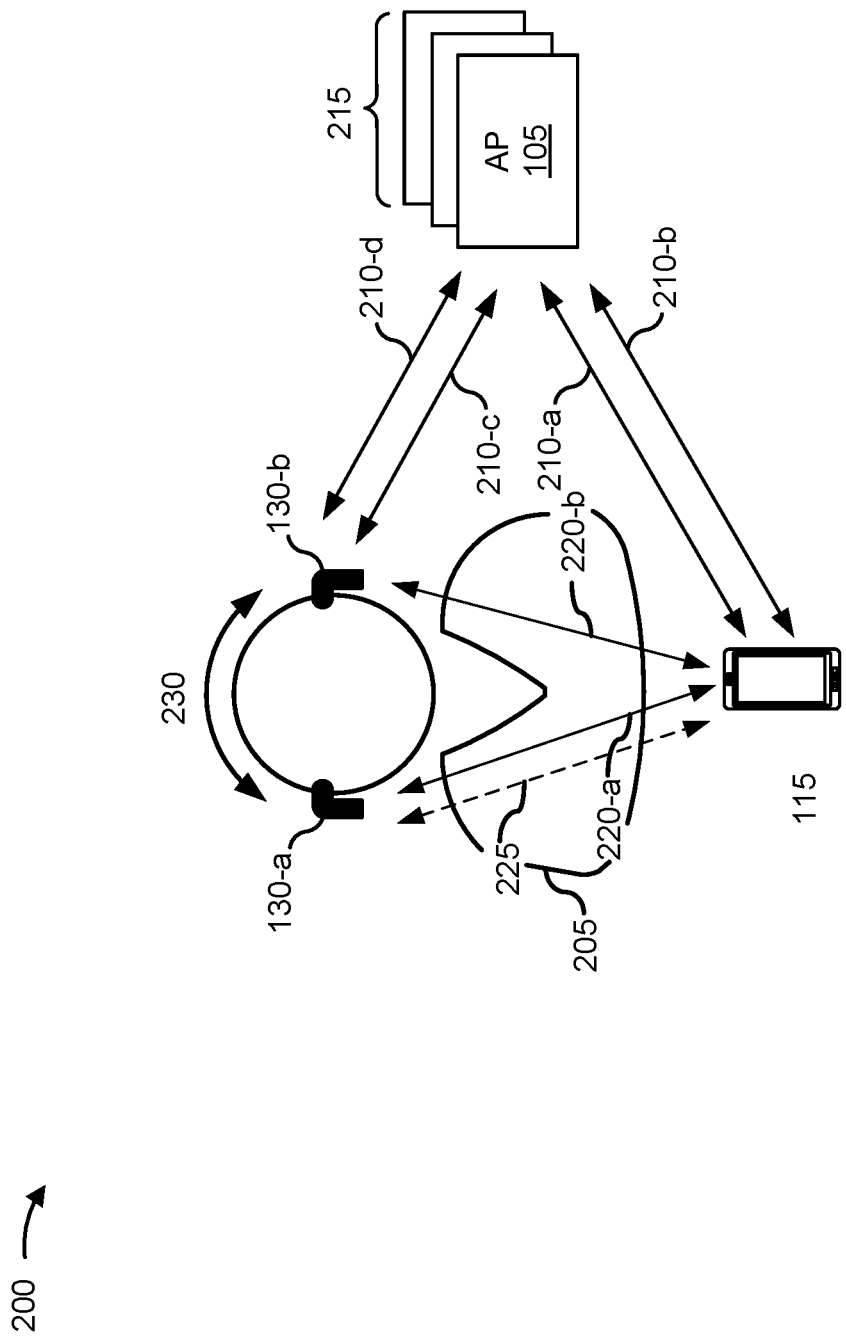
FIG. 2 illustrates an example of a wireless communication system in accordance with the present disclosure.

FIG. 2 illustrates an example of a wireless communication system 200 in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and a wireless earbud 130-*a* and a wireless earbud 130-*b* of a user 205 (e.g., examples of audio devices and/or peripheral devices), which may be examples of corresponding devices as illustrated by and described with reference to FIG. 1. In some implementations, the device 115, the wireless earbud 130-*a*, and the wireless earbud 130-*b* may support a signaling-based mechanism according to which the device 115 may transmit an indication of a set of updated parameters to each of the wireless earbud 130-*a* and the wireless earbud 130-*b* via one or audio data packets.

In some deployments, the device 115 may communicate with the AP 105 via one or both of a link 210-*a* and a link 210-*b*, which may be examples of infrastructure links between the AP 105 and the device 115. Alternatively, or additionally, the AP 105 may communicate with the wireless earbud 130-*a* and/or the wireless earbud 130-*b* via one or both of a link 210-*c* and a link 210-*d*, respectively. In some aspects, the wireless earbud 130-*a* and the wireless earbud 130-*b* may be connected to a same AP 105 as the device 115, while in other aspects, the wireless earbud 130-*a* and the wireless earbud 130-*b* may be connected to a different AP 105 as the device 115. Accordingly, and as shown by reference number 215, the device 115, the wireless earbud 130-*a*, and/or the wireless earbud 130-*b* may communicate with one another via multiple APs 105. The link 210-*a* may be an example of a 2.4 GHz link between the AP 105 and the device 115, and the link 210-*b* may be an example of a 5 GHz link or a 6 GHz link between the AP 105 and the device 115. In some aspects, the link 210-*c* and/or the link 210-*d* may be a 2.4 GHz link, a 5 GHz, and/or a 6 GHz link.

The device 115 may communicate wirelessly with each of the wireless earbud 130-*a* and the wireless earbud 130-*b*, where each of the wireless earbud 130-*a* and the wireless earbud 130-*b* may be associated with an XPAN of the device 115. For example, the device 115 may communicate with the wireless earbud 130-*a* via a link 220-*a* and may communicate with the wireless earbud 130-*b* via a link 220-*b*, where the link 220-*a* and the link 220-*b* may be referred to or understood as XPAN links. The link 220-*a* may be an example of a 5 GHz link or a 6 GHz link and the link 220-*b* may be an example of a 5 GHz link or a 6 GHz link. Additionally, in some examples, the device 115 may communicate with the wireless earbud 130-*a*, which may be an example of a primary earbud, via a communication link 225. The communication link 225 may be an example of a Bluetooth link between the device 115 and the wireless earbud 130-*a*. The wireless earbud 130-*a* and the wireless earbud 130-*b*, which may be an example of a secondary earbud, may communicate with each other via a link 230, which may be an example of a Bluetooth link between the wireless earbud 130-*a* and the wireless earbud 130-*b*.

The device 115 may communicate with the wireless earbud 130-*a* and/or the wireless earbud 130-*b* via one or more APs 105. To illustrate, the device 115 may communicate with a first AP 105 via the link 210-*a* and/or the link 210-*b*. The first AP 105 may be connected to a second AP 105, and the second AP 105 may be connected to the wireless earbud 130-*a* and/or the wireless earbud 130-*b* via the link 210-*c* and/or the link 210-*d*. Accordingly, the device 115 may communicate with the wireless earbud 130-*a* and/or the wireless earbud 130-*b* based at least in part on communicating with the first AP 105, the first AP 105 communicating with the second AP 105, and the second AP 105 communicating with the wireless earbud 130-*a* and/or the wireless earbud 130-*b*. However, in other aspects, the device 115, the wireless earbud 130-*a*, and/or the wireless earbud 130-*b* may be connected to a same AP 105.

In some cases, the device 115, the wireless earbud 130-*a*, and the wireless earbud 130-*b* may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-*a* and the wireless earbud 130-*b* (e.g., personal devices of the device 115). For such applications, the device 115 may be expected to keep end-to-end latency below a relatively stringent latency target (e.g., 40 milliseconds (msec) for ULL gaming). Further, the device 115 may also be tasked with handling (e.g., gracefully handling without a hard disconnect and/or loss of data) a coexistence of XPAN traffic (e.g., traffic to or from one or both of the wireless earbud 130-*a* and the wireless earbud 130-*b*) with other concurrency scenarios the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may have an operating condition and/or an operating specification to meet, such as a data transfer latency operating condition for various applications or use cases (e.g., an ultra-low-latency constraint for a ULL gaming use case) and also facilitate coexistence between XPAN and other concurrency scenarios on the device 115. To meet the latency operating condition associated with, for example, ULL gaming, a power constraint of the wireless earbud 130-*a* and the wireless earbud 130-*b*, and/or power and concurrency constraints at the device 115, the device 115 may employ a TWT technique for the communication between the device 115 (which may act or function as an SAP) and each of the wireless earbud 130-*a* and wireless earbud 130-*b* (which may act or function as STAs). Alternatively, or additionally, the device 115 may employ one or more power saving mode time synchronization techniques as described below.

In some implementations, the device 115, the wireless earbud 130-*a*, and the wireless earbud 130-*b* may support a data-packet-generation-based and signaling-based mechanism according to which the device 115 may embed an indication of one or more updated parameters in one or more audio data packets that the device 115 may transmit to the wireless earbud 130-*a* and the wireless earbud 130-*b*. For example, if the device 115 detects a change that triggers a parameter update, or if the device 115 otherwise determines to transmit a set of parameters to the wireless earbud 130-*a* and the wireless earbud 130-*b* with low latency, the device 115 may embed the parameters in one or more downlink audio data packets and may transmit the one or more downlink audio data packets to the wireless earbud 130-*a* and the wireless earbud 130-*b*. In some implementations, the device 115 may transmit an indication of the parameters to the wireless earbud 130-*a* via a first audio data packet transmitted using a first Wi-Fi link (e.g., a first XPAN Wi-Fi link) and may transmit an indication of the parameters to the wireless earbud 130-*b* via a second audio data packet transmitted using a second Wi-Fi link (e.g., a second XPAN Wi-Fi link). The first audio data packet and the second audio data packet may include the same information or may include different information, and each may be examples of physical layer convergence protocol (PLCP) protocol data units (PPDUs).

Oftentimes, a WCD, such as the device 115, and/or a peripheral device, such as the wireless earbud 130-*b* and/or the wireless earbud 130-*b*, may operate based at least in part on using a battery as an energy source. Using a battery provides mobility to the WCD and/or the peripheral device by enabling the device to operate without a wired link that would otherwise tether the WCD and/or the peripheral device to a fixed location. That is, the use of a battery may enable the WCD and/or the peripheral device to freely change locations. In some aspects, a size of the WCD and/or the peripheral device may determine a power capacity and/or battery size of the battery included in the device. Accordingly, a smaller device (e.g., the peripheral device) may include a smaller battery with less power capacity relative to a larger device (e.g., the WCD).

One way to reduce power consumption and/or increase a duration of a battery life pertains to the device operating in a power saving mode that is associated with the device iteratively and/or periodically transitioning between an active state and a sleep state. While operating in a sleep state, the associated device may refrain from transmitting, receiving, and/or processing wireless communications. While operating in an active state, the associated device may transmit, receive, and/or process the wireless communications. The device may use different durations for operating the sleep state and the active state. For example, a first duration that is associated with operating in the sleep state may be longer than a second duration that is associated with the active state. Increasing the duration of a sleep state may result in increased power savings.

In some aspects, a time synchronization protocol, such as a PTP that synchronizes clocks in a network, may be based at least in part on the various devices operating in an active mode. That is, the time synchronization protocol may fail to account for one or more of the devices transitioning between the active state and the sleep state, resulting in synchronization errors that exceed a threshold. To illustrate, "asynchronous playback" may denote a first playback of audio samples (e.g., by the wireless earbud 130-*a*) being misaligned in time with second playback of the audio samples (e.g., by the wireless earbud 130-*b*). In some aspects, asynchronous playback that is misaligned between at least two devices by at least a threshold may be observable to a listener and/or may degrade the output audio. One example is asynchronous playback that is misaligned by at least 0.2 milliseconds (msecs). Accordingly, an increased skew (e.g., the time misalignment) in audio playback by a first peripheral device relative to audio playback by a second peripheral device may result in reduced audio playback quality.

The use of APs to communicate the audio data (e.g., one or more of APs 105) may also result in increased synchronization errors between an audio source (e.g., a WCD and/or a first device 115) and an audio destination (e.g., a peripheral device, a second device 115, a wireless earbud 130-*a*, and/or a wireless earbud 130-*b*) based at least in part on the multiple clock domains being involved in the communication. As one example, an audio communication between a device 115 and a pair of wireless earbuds 130 may be based at least in part on a first clock at the device 115, a second clock at a first AP 105, a third clock at a second AP 105, a fourth clock at the wireless earbud 130-*a*, and/or a fifth clock at the wireless earbud 130-*b*. In some aspects, a WCD and/or a peripheral device may transition to different APs, resulting in increased complexity in synchronizing the clocks and, subsequently, increased synchronization errors. Increased synchronization errors between an audio source and an audio destination may result in reduced audio playback quality at the audio destination.

Some techniques and apparatuses described herein provide time synchronizing a wireless communication device and a peripheral device based on a link that uses one or more access points. In some aspects, a peripheral device may synchronize a local clock to an AP timing synchronization function clock (TSF_AP) that is maintained by an AP connected to the peripheral device. To illustrate, the peripheral device may initialize and/or synchronize a first time base of the local clock at the peripheral device using a second time base that is associated with the TSF_AP. The peripheral device may maintain, based at least in part on the local clock, an estimated time-to-play timing synchronization function software clock (TSF_est) that is associated with outputting user data. For example, the peripheral device may initialize the TSF_est based at part on the local clock. Alternatively, or additionally, the peripheral device may be a first peripheral device in a peripheral device pair, and a second peripheral device in the peripheral device pair may synchronize to the AP (e.g., the same AP as the first peripheral device) such that a second local clock at the second peripheral device is based at least in part on the same AP as a first local clock at the first peripheral device. In some aspects, the peripheral device (e.g., the first peripheral device) may receive, from the AP, timing synchronization information that is based at least in part on a comparison between a WCD TSF_soft and the TSF_est. That is, the timing synchronization information may indicate one or more timing metrics that may be used by the peripheral device to mitigate timing differences between the TSF_est and the WCD TSF_soft. In some aspects, the timing differences may be based at least in part on the WCD and the peripheral device being connected to different APs. Accordingly, the peripheral device may output user data based at least in part on the TSF_est and the timing synchronization information. To illustrate, the peripheral device may output audio data based at least in part on the TSF_est and the timing synchronization information.

In some aspects, a WCD may maintain a WCD TSF_soft (e.g., a WCD TTP TSF clock) that is associated with outputting user data at a peripheral device. As described below, the WCD may calculate timing synchronization information that is associated with synchronizing the WCD TSF_soft and a TSF_est that is local to the peripheral device. Based at least in part on calculating the timing synchronization information, the WCD may transmit, to an AP, a message that indicates the timing synchronization information and is addressed to the peripheral device. In some aspects, the peripheral device is a first peripheral device in a peripheral device pair, and the WCD may transmit, to the AP, a second message that indicates the timing synchronization information and is addressed to a second peripheral device of the peripheral device pair.

Each peripheral device in a peripheral device pair may connect to a same AP and use a clock and/or timing base associated with the AP (e.g., a TSF_AP) to initialize a respective, local clock at the peripheral device, such as a hardware clock. Alternatively, or additionally, each peripheral device in the peripheral device pair may maintain and/or synchronize a time-to-play (TTP) software clock, such as the TSF_est as described above, using the clock associated with the AP as a common network clock for each peripheral device (e.g., a network clock that is common and/or shared by each peripheral device). The use of the AP as a common network clock for each peripheral device in the peripheral device pair may enable synchronization between the peripheral devices without the peripheral devices performing a synchronization procedure together and/or independent of the peripheral devices operating in a sleep state. Alternatively, or additionally, each peripheral device synchronizing to the AP clock as a common clock may result in more robust and/or stable playback based at least in part on the use of a common network clock reducing a size of a skew between the peripheral devices (e.g., relative to the peripheral devices performing a synchronization procedure with one another). A reduced skew size may improve an audio playback quality.

In some aspects, the WCD may synchronize a WCD TSF_soft (e.g., a TTP software clock at the WCD) with a TSF_est at a peripheral device (e.g., an estimate of the WCD TSF_soft at the peripheral device). For example, and as described below, the WCD may generate, based at least in part on one or more timing synchronization algorithms, timing synchronization information that mitigates timing alignment errors between the WCD and a peripheral device (e.g., the WCD TSF_soft and the TSF_est). Alternatively, or additionally, the timing synchronization information may enable each peripheral device to playback audio based at least in part on using a local clock at the peripheral device that is synchronized to the common network clock. Performing time synchronization with the AP, and/or using the timing synchronization information to adjust a playback time of audio, may mitigate time alignment errors between the WCD and a peripheral device and result in an increased audio playback quality by the peripheral device pair (e.g., audio playback with negligible timing differences and/or audio playback differences that are unnoticed by a listener).

In some aspects, each peripheral device may calculate a clock drift metric and/or a clock offset metric of the shared AP (e.g., the common network clock), and select the peripheral with a stronger signal (e.g., indicated based at least in part on the clock drift metric and/or the clock offset metric) to operate as a primary peripheral device and improve communications (e.g., reduced recovery errors, increased data throughput, and/or reduced data transfer latencies) with the AP relative to the secondary peripheral device with a weaker signal communicating with the AP.

As indicated above, FIG. 2 is provided as an example. Other examples may differ from what is described with regard to FIG. 2.

Figure 3:
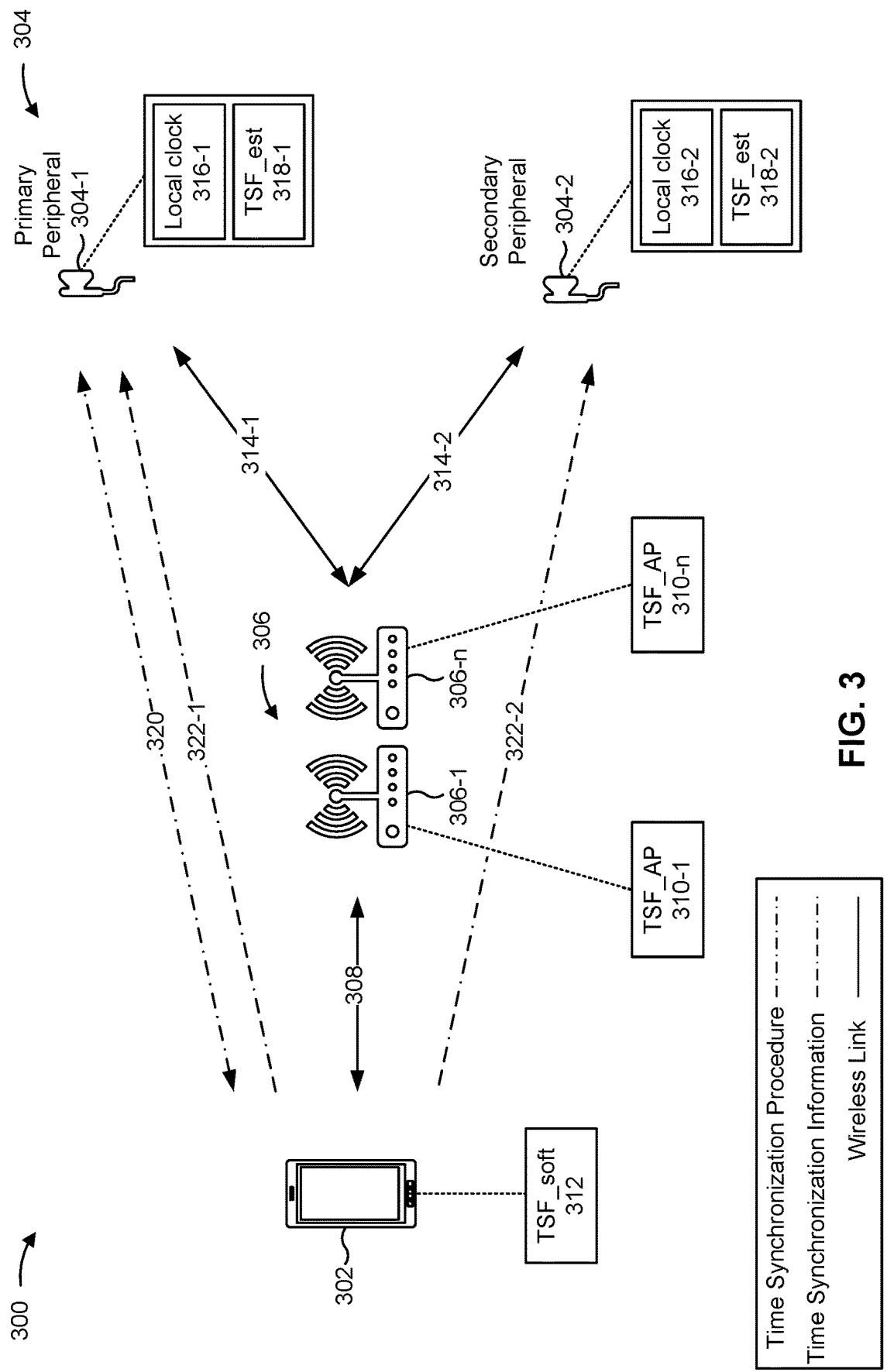
FIG. 3 is a diagram illustrating an example of time synchronization between a wireless communication device (WCD) and a peripheral device pair that is based at least in part on a link that uses one or more access points (APs), in accordance with the present disclosure.

FIG. 3 is a diagram illustrating an example 300 of time synchronization between a WCD 302 and a peripheral device pair 304 that is based at least in part on a link that uses one or more APs 306, in accordance with the present disclosure. In some aspects, the peripheral device pair 304 may include a primary peripheral device 304-1 and a secondary peripheral device 304-2. In the example 300, the APs 306 include a first AP 306-1 and an n-th AP 306-n, where n is an integer.

As shown by reference number 308, the WCD 302 may wirelessly connect to the AP 306-1. In some aspects, the AP 306-1 initializes and/or maintains a first TSF_AP 310-1 that may be used as a primary clock for devices connected to the AP 306-1. As one example, the WCD 302 may synchronize to the TSF_AP 310-1 based at least in part on a time synchronization protocol, such as PTP, and may initialize a TTP TSF clock (e.g., TSF_soft 312) based at least in part on the AP primary clock (e.g., TSF_AP 310-1).

As shown by reference number 314-1, the primary peripheral device 304-1 may wirelessly connect to the AP 306-n and, as shown by reference number 314-2, the secondary peripheral device 304-2 may also wirelessly connect to the AP 306-n. That is, the primary peripheral device 304-1 and the secondary peripheral device 304-2 may connect to a same AP. In a similar manner as the AP 306-1, the AP 206-n may initialize and/or maintain an n-th TSF_AP 310-n that connected devices may use as a primary clock. To illustrate, the primary peripheral device 304-1 may initialize and/or synchronize a first local clock 316-1 (e.g., a first hardware clock and/or a first TSF clock) to the TSF_AP 310-*n*, and the secondary peripheral device 304-2 may initialize and/or synchronize a second local clock 316-2 (e.g., a second hardware clock and/or a second TSF clock) to the TSF_AP 310-*n*. Accordingly, the respective local clocks at the primary peripheral device 304-1 and the secondary peripheral device 304-2 may be synchronized with one another based at least in part on each peripheral device synchronizing to a common network clock (e.g., the TSF_AP 310-*n*). To illustrate, each peripheral device may time synchronize to the TSF_AP 310-*n* using PTP and/or based at least in part on operating in an active state.

In some aspects, the peripheral device pair 304 may connect to the WCD 302 through the APs 306. As one example, the WCD 302 may transmit a first message to the AP 306-1 that is addressed to the primary peripheral device 304-1 and/or a second message to the AP 306-1 that is addressed to the secondary peripheral device 304-2. In some aspects, the AP 306-1 may forward, relay, and/or transmit the first message and/or the second message to the AP 306-*n* (e.g., either directly or via one or more additional APs), and the AP 306-*n* may forward, relay, and/or transmit the respective message to the respective peripheral device. Alternatively, or additionally, each peripheral device may transmit a respective message to the WCD 302 in a similar manner and through the APs 306.

Based at least in part on having a connection to the WCD 302, the primary peripheral device 304-1 may locally initialize, maintain, and/or calculate a first estimation of the TSF_soft 312, which is shown in FIG. 3 as TSF_est 318-1. That is, the primary peripheral device 304-1 may maintain a TSF that operates as the estimation and/or may calculate a time metric associated with the estimation. Alternatively, or additionally, the secondary peripheral device 304-2 may locally initialize, maintain, and/or calculate a second estimation of the TSF_soft 312, which is shown in FIG. 3 as TSF_est 318-2. In a similar manner as the primary peripheral device 304-1, the secondary peripheral device 304-2 may maintain a TSF that operates as the estimation and/or may calculate a time metric associated with the estimation. In some aspects, the WCD 302 may indicate timing information that the primary peripheral device 304-1 and/or the secondary peripheral device 304-2 use to initialize the TSF_est 318-1 and/or the TSF_est 318-2. As one example, the WCD 302 and the primary peripheral device 304-1 may perform an XPAN synchronization procedure as described with regard to FIG. 4.

The primary peripheral device 304-1 may output user data transmitted by the WCD 302 based at least in part on the TSF_est 318-1, and the secondary peripheral device 304-2 may output user data transmitted by the WCD 302 based at least in part on TSF_est 318-2. To illustrate, the WCD 302 may transmit, as the user data, audio data that is based at least in part on an audio frame timing information (e.g., audio frame TTP information) that uses TSF_soft 312 as a time reference, and each peripheral device may use the respective local estimation of TSF_soft 312 (e.g., TSF_est 318-1 and TSF_est 318-2) to output the audio data. Skew between audio playback by each peripheral device may be mitigated based at least in part on each peripheral device time synchronizing to a common network clock and/or a same AP (e.g., the AP 306-*n*).

In some aspects, the WCD 302 may calculate timing synchronization information to mitigate misalignment between TSF_soft 312 local to the WCD 302 and the local estimations of TSF_soft 312 at the peripheral devices. To illustrate, and as shown by reference number 320, the WCD 302 may perform one or more time synchronization procedures with the primary peripheral device 304-1. As one example, the WCD 302 may time synchronize with the primary peripheral device 304-1 based at least in part on a time synchronization protocol (e.g., PTP), such as that described below with regard to FIG. 4. Alternatively, or additionally, as a second example, the WCD 302 may calculate timing synchronization information that mitigates a misalignment between TSF_soft 312 and the local estimations of TSF_soft 312 at the peripheral devices (e.g., TSF_est 318-1 and TSF_est 318-2). To illustrate, the WCD 302 and/or the primary peripheral device 304-1 may perform one or more time synchronization procedures and/or actions as described below with regard to FIG. 5 that, in combination with the PTP-based time synchronization, enable the WCD 302 to calculate metrics that characterize the misalignment. Non-limiting examples of timing synchronization information calculated by the WCD 302 may include a clock drift between TSF_soft and the TSF_est 318-1 and/or a clock offset between TSF_soft and the TSF_est 318-2.

As shown by reference number 322-1, the WCD 302 may transmit, and the primary peripheral device 304-1 may receive, a first indication of the timing synchronization information. As one example, the WCD 302 may transmit the timing synchronization information in a user datagram protocol (UDP) message. As shown by reference number 322-2, the WCD 302 may transmit, and the secondary peripheral device 304-2 may receive, a second indication of the timing synchronization information. In some aspects, timing synchronization information that mitigates time misalignment between TSF_soft 312 at the WCD 302 and the TSF_est 318-1 at the primary peripheral device 304-1 may also mitigate time misalignment between TSF_soft 312 at the WCD 302 and the TSF_est 318-2 at the secondary peripheral device 304-2 based at least in part on the peripheral device pair 304 being connected to a same AP and/or a common network clock. The primary peripheral device 304-1 and/or the secondary peripheral device 304-2 may output the user data, such as audio data, based at least in part on converting audio frame timing information and/or a local estimation of a playback clock (e.g., TSF_est 318-2 and TSF_est 318-2) to local time at the respective peripheral device (e.g., local clock 316-1 and/or local clock 316-2) using the timing synchronization information to adjust a playback time.

By connecting to a same AP and using a timing base associated with the AP as a common network clock, peripheral devices in a peripheral device pair may maintain synchronization with one another without performing a synchronization procedure with one another. That is, each peripheral device may initialize a respective, local clock using a same time base from the AP. Each peripheral device synchronizing to the AP clock as a common network clock may result in more robust and/or stable playback by the peripheral device pair based at least in part on reducing a size of skew between the peripheral devices. Alternatively, or additionally, a WCD may calculate timing synchronization information that mitigates misalignment between a TTP software clock at the WCD (e.g., TSF_soft) with the estimated TTP software clock at the peripheral device pair. Mitigating time misalignment between the WCD and a peripheral device may increase audio playback quality by the peripheral device pair, such as by producing audio playback that has negligible timing differences and/or audio playback differences that are unnoticed by a listener.

As indicated above, FIG. 3 is provided as an example. Other examples may differ from what is described with regard to FIG. 3.

Figure 4:
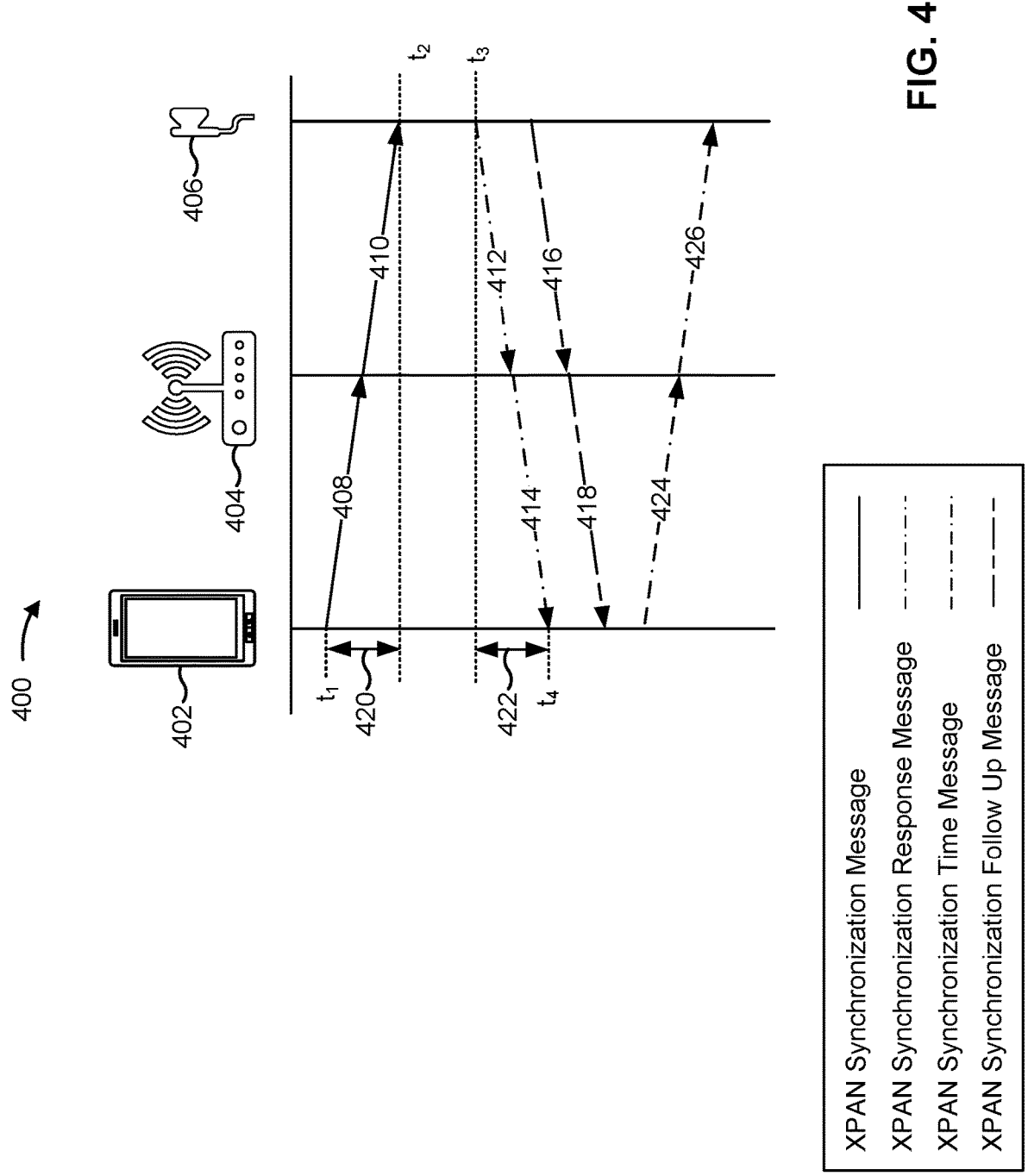
FIG. 4 is a diagram illustrating an example of a time synchronization procedure that is based at least in part on interactions between a WCD, an AP, and a peripheral device, in accordance with the present disclosure.

FIG. 4 is a diagram illustrating an example 400 of a time synchronization procedure that is based at least in part on interactions between a WCD 402 (e.g., a device 115), an AP 404 (e.g., an AP 105), and a peripheral device 406 (e.g., another device 115, a wireless earbud 130-a, and/or a wireless earbud 130-b), in accordance with the present disclosure. In some aspects, the time synchronization procedure included in the example 400 may be an XPAN synchronization procedure. For visual clarity, FIG. 4 illustrates a single AP 404 in communication with the WCD 402 and the peripheral device 406, but other examples may include multiple APs that, collectively, relay communications between the WCD 402 and the peripheral device 406. For example, the WCD 402 may communicate with a first AP, the first AP may communicate with a second AP, and the second AP may communicate with the peripheral device 406, as described with regard to FIG. 3. In the example 400, the WCD 402 and peripheral device 406 do not operate in respective power saving modes.

In some aspects, a WCD 402 may calculate timing synchronization information that is associated with the WCD 402 communicating with a peripheral device (e.g., the peripheral device 406) based at least in part on a time synchronization procedure that is associated with transmitting and/or receiving XPAN messages (e.g., an XPAN synchronization procedure). As an example, the timing information may include and/or be based at least in part on a send transport delay (e.g., from the WCD 402 to the peripheral device 406) and/or a return transport delay (e.g., from the peripheral device 406 to the WCD 402). In some aspects, a send transport path and/or a return transport path between the WCD 402 and the peripheral device 406 may include the AP 404.

To illustrate, and as shown by reference number 408, the WCD 402 may transmit, to the AP 404 at time $t_1$, an XPAN synchronization message (shown with a solid arrow) that is addressed to the peripheral device 406. As shown by reference number 410, the AP 404 may forward, relay, and/or transmit the XPAN synchronization message to the peripheral device 406 shortly after receiving the XPAN synchronization message from the WCD 402 (e.g., with a processing delay and/or without an intentional delay). As shown by FIG. 4, the XPAN synchronization message may arrive at the peripheral device 406 at time $t_2$. As shown by reference number 412, and based at least in part on receiving the XPAN synchronization message, the peripheral device 406 may transmit, to the AP 404 at time $t_3$, an XPAN synchronization response message (shown with a dash-dot arrow) that is addressed to the WCD 402. As shown by reference number 414, the AP 404 may forward, relay, and/or transmit the XPAN synchronization response message to the WCD 402, and the XPAN synchronization response message may arrive at the WCD 402 at time $t_4$. Alternatively, or additionally, as shown by reference number 416, the peripheral device 406 may transmit, to the AP 404, an XPAN synchronization follow up message (shown with a long-dash-short-dash arrow) that is addressed to the WCD 402. As shown by reference number 418, the AP 404 may forward, relay, and/or transmit the XPAN synchronization follow up message to the WCD 402.

In some aspects, the WCD 402 may calculate timing synchronization information based at least in part on the XPAN synchronization message and the XPAN synchronization response message. To illustrate, the WCD 402 and the peripheral device 406 may not share a common clock (e.g., in a mesh network), and the WCD 402 may calculate, as the timing synchronization information, adjustments that may be applied at the peripheral device 406 to help align a first clock at the peripheral device 406 with a second clock at the WCD 402. In some aspects, the WCD 402 may calculate the timing synchronization information based at least in part on an assumption that a first transmission duration 420 that is associated with a send path (e.g., from the WCD 402 to the peripheral device 406) and a second transmission duration 422 on a return path (e.g., from the peripheral device 406 to the WCD 402) are symmetrical and/or have commensurate transmission durations. That is, the WCD 402 may calculate timing information based at least in part on the assumption that a round-trip-time (RTT) is symmetrical. To illustrate, the WCD 402 may calculate the timing synchronization information based at least in part on the following formulas:

$$\text{Path\_Delay} = \frac{(t_4 - t_1) - (t_3 - t_2)}{2} \quad (1)$$

$$\text{Time\_Offset} = (t_2 - t_1) - \text{Path\_Delay} \quad (2)$$

$$TSF_{est} = TSF_{SoftAP} + \text{Time\_Offset} \quad (3)$$

where $TSF_{est}$ represents an estimation of the first clock at the peripheral device 406, and $TSF_{SoftAP}$ is the second clock at the WCD 402 (e.g., another TSF). As shown by reference number 424, the WCD 402 may transmit, to the AP 404, an XPAN synchronization time message (shown with a dash-dash-dot arrow) that is addressed to the peripheral device 406 and is based at least in part on the timing synchronization information. As one example, the XPAN synchronization time message may indicate any combination of a path delay (e.g., a send transport delay and/or a return transport delay), a time offset, and/or an estimation of the TSF at the WCD 402. As shown by reference number 426, the AP 404 may forward, relay, and/or transmit the XPAN synchronization time message to the peripheral device 406.

Differences in successive clock offset estimates as described with regard to equation (2) may be used to calculate a drift of the clock offset over time. As one example, the clock drift may be calculated (e.g., by the WCD 402 and/or a peripheral device 406) based at least in part on the following equations:

$$TimeDifference = \text{time}_2 - \text{time}_1 \quad (4)$$

$$OffsetDifference = \text{clock offset}_2 - \text{clock offset}_1 \quad (5)$$

$$EstimatedDrift = OffsetDifference / TimeDifference \quad (6)$$

where $\text{time}_2$ represents a second time associated with the latest clock offset estimation, $\text{time}_1$ represents a first time associated with the last (or a prior) clock offset estimation, clock offset$_2$ represents the latest clock offset estimation, and clock offset$_1$ represents the last (or a prior) clock offset estimation.

As indicated above, FIG. 4 is provided as an example. Other examples may differ from what is described with regard to FIG. 4.

Figure 5:
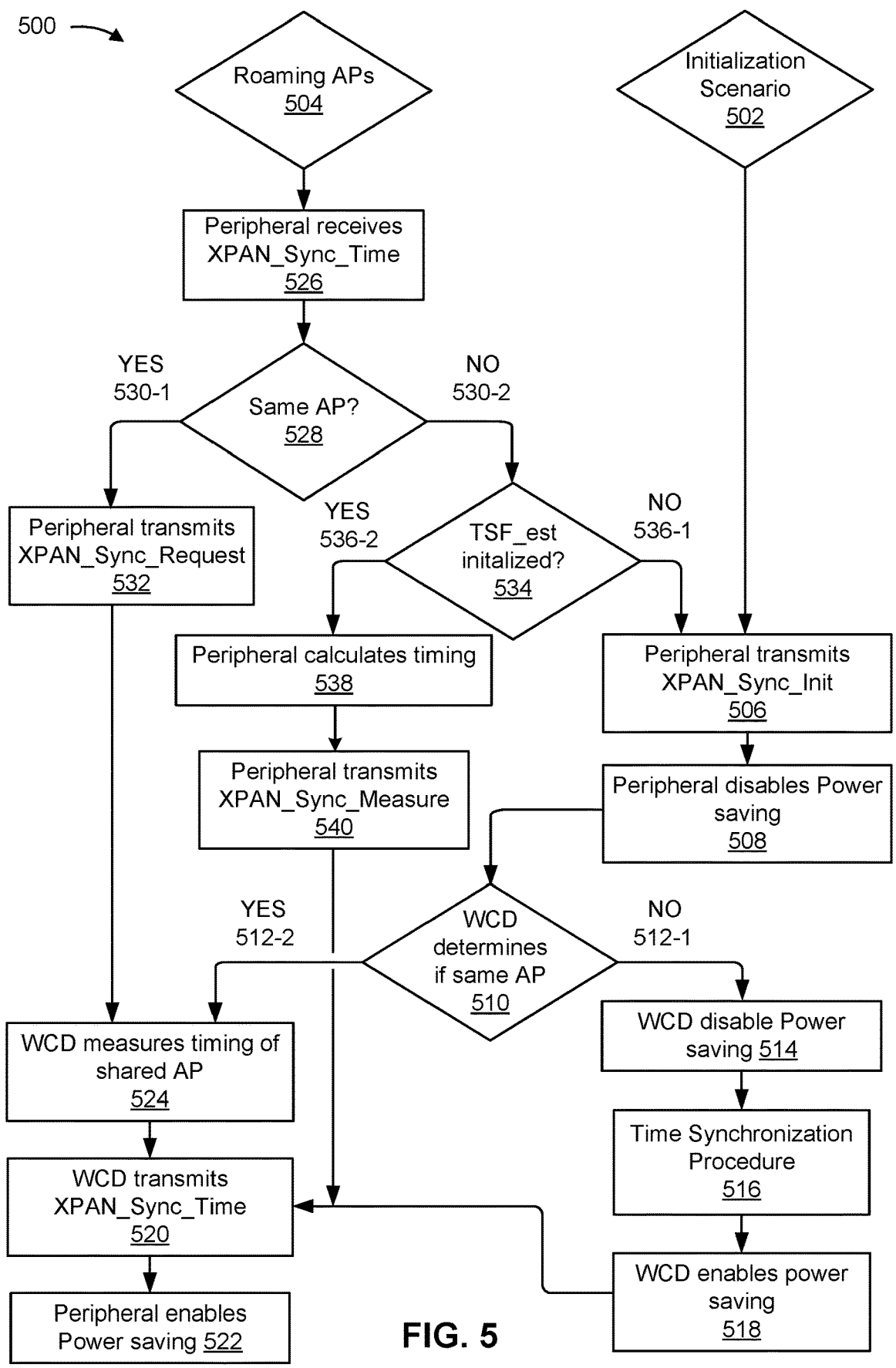
FIG. 5 is a diagram illustrating an example of synchronization procedures, in accordance with the present disclosure.

FIG. 5 is a diagram illustrating an example 500 of time synchronization procedures, in accordance with the present disclosure.

As described above, a device that uses a battery, such as a device 115 (e.g., a WCD) and/or a peripheral device (e.g., another device 115, a wireless earbud 130-a, and/or a wireless earbud 130-b) may freely change locations. In some aspects, changing locations may result in the device disconnecting from a first AP and/or connecting to a second AP. Changing AP connections may introduce timing errors into timing synchronization information. To illustrate, different APs may have different timing bases and/or timing characteristics. That is, the first AP may have a first clock drift and/or a first clock offset relative to a TSF_est at a peripheral device and/or a TSF_soft at a WCD, and the second AP may have a second clock drive and/or clock offset relative to the TSF_est and/or the WCD. To mitigate synchronization errors, a WCD may calculate estimations of the timing differences (e.g., in clock drift and/or clock offset). However, without using existing timing information, the timing synchronization procedures used by the WCD to calculate the estimations may result in increased network messaging, increased air interface resource usage, and/or increased power consumption by the WCD and/or a peripheral device. To illustrate, the WCD may calculate the timing differences each time the WCD and/or the peripheral device changes an AP connection.

To reduce network messaging, reduce air interface resource usage, and/or reduce power consumption, the WCD may calculate updated timing synchronization information that is associated with a change in an AP connection based at least part on existing and/or current timing synchronization information. Alternatively, or additionally, a peripheral device (e.g., a wireless earbud 130-a and/or a wireless earbud 130-b) may calculate, based at least in part on a current TSF_est that is associated with a first AP that the peripheral device is disconnecting from, a relative clock drift and/or a relative clock offset that is associated with a second AP that the peripheral device is connecting to. For instance, the peripheral device may initialize a second TSF clock and/or a second local clock based at least in part on a second TSF_AP associated with the second AP, and calculate the timing differences between the second TSF clock and the first TSF clock associated with the first AP (e.g., the TSF_est). Alternatively, or additionally, the peripheral device may calculate the timing differences between the second local clock and the first local clock that is associated with the first AP. Based at least in part on calculating the timing differences, the peripheral device may transmit an indication of the timing differences (e.g., relative clock drift and/or relative clock offset) to the WCD. Based at least on part on a connection scenario, the WCD and/or the peripheral device may calculate the updated timing synchronization information and/or timing differences using different time synchronization procedures.

The flow chart included in the example 500 illustrates three different connection scenarios that are associated with a peripheral device establishing a connection to an AP: (1) an initialization scenario (e.g., a peripheral device pair being taking out of a housing case), (2) a same AP connection scenario, and (3) a different APs connection scenario. Accordingly, the flow diagram illustrates one or more actions that may be included in, and/or at least part of, a first time synchronization procedure associated with the initialization scenario as shown by reference number 502. The flow diagram also illustrates one or more actions that may be included in, and/or at least part of, a second time synchronization procedure associated with the same AP scenario as shown by reference number 504. A third synchronization procedure that is associated with the different APs scenario may be based at least in part on one or more actions included in the flow diagram that also starts at reference number 504.

As part of the first time synchronization procedure, and with regard to the initialization scenario, a peripheral device (e.g., a primary peripheral device and/or a secondary peripheral device) may transmit, and a WCD may receive by way of one or more APs, an XPAN synchronization initialization message as shown by reference number 506. In some aspects, the XPAN synchronization initialization message may indicate that the peripheral device is performing an initialization procedure and/or lacks timing synchronization information.

In some aspects, the peripheral device may disable a power saving mode as shown by reference number 508. To illustrate, the peripheral device may indicate a request to perform an initialization time synchronization procedure that generates baseline and/or initial timing synchronization information, such as that described with regard to FIG. 4. The peripheral device may indicate the request based at least in part on transmitting the XPAN synchronization initialization message.

Based at least in part on receiving the XPAN synchronization initialization message, the WCD may determine whether the WCD and the peripheral device are connected to different APs or a same AP, as shown by reference number 510. Based at least in part on determining that the WCD and the peripheral device are connected to different APs, the WCD may follow branch 512-1 of the flow diagram. Based at least in part on determining that the WCD and the peripheral device are connected to the same APs, the WCD may follow branch 512-2 of the flow diagram.

Branch 512-1 is associated with the WCD and the peripheral device being connected to different APs. In some aspects, the WCD may determine that the peripheral device is connected to a different AP, such as by comparing AP identifiers included in one or more messages. Accordingly, the WCD may disable a power saving mode as shown by reference number 514. Alternatively, or additionally, and as shown by reference number 516, the WCD may perform, in combination with the peripheral device, one or more time synchronization procedures, such as the time synchronization procedure as described with regard to FIG. 4. As part of performing the time synchronization procedure, the WCD may calculate timing synchronization information, such as RTT, a clock drift metric, and/or a clock offset metric. Alternatively, or additionally, the WCD may enable the power saving mode as shown by reference number 518 and/or transmit the timing synchronization information to the peripheral device as shown by reference number 520. As an example, the WCD may transmit an XPAN synchronization time message that indicates the timing synchronization information. Based at least in part on receiving the timing synchronization information, the peripheral device may enable a power saving mode as shown by reference number 522. Alternatively, or additionally, the peripheral device may initialize a local clock and/or a TSF_est based at least in part on the timing synchronization information. By disabling respective power saving modes, the WCD and the peripheral device may exchange XPAN synchronization messages that do not incur a delay associated with one or both devices transitioning to a sleep mode. Based at least in part on completing the initialization time synchronization procedure, each device may enable the respective power saving mode to preserve a battery life of the device.

Branch 512-2 is associated with the WCD and the peripheral device being connected to a same AP. In some aspects, the WCD may determine that the peripheral device is connected to the same AP as described above. Accordingly, and as shown by reference number 524, the WCD may calculate and/or measure timing synchronization information (e.g., a clock drift and/or a clock offset) associated with the AP that is shared with the peripheral device. In some aspects, the WCD may calculate the timing synchronization information without transmitting a message to the peripheral device. Based at least in part on calculating the timing synchronization information, the WCD may transmit the timing synchronization information to the peripheral device as shown by reference number 520. In some aspects, the WCD may transmit a first indication of the timing synchronization information to a primary peripheral device and a second indication of the timing synchronization information to a secondary peripheral device. That is, the timing synchronization information may be applied by both peripheral devices based at least in part on the peripheral device pair being synchronized to a common network clock. The peripheral device (e.g., the primary peripheral device and/or the secondary peripheral device) may enable a power saving mode as shown by reference number 522 based at least in part on receiving the timing synchronization information. To illustrate, receipt of the timing synchronization information may indicate that the time synchronization procedure has been completed.

As part of the second time synchronization procedure and the third time synchronization procedure, the peripheral device may receive an XPAN synchronization time message as shown by reference number 526 and, based at least in part on receiving the XPAN synchronization time message, may determine whether an AP connected to the peripheral device is a same AP connected to the WCD as shown by reference number 528. Based at least in part on determining that the WCD and the peripheral device are connected to a same AP, the peripheral device and/or the WCD may follow branch 530-1 of the flow diagram. Based at least in part on determining that the WCD and the peripheral device are connected to different APs, the WCD and/or the peripheral device may follow branch 530-2 of the flow diagram.

Branch 530-1 is associated with a peripheral device transitioning, roaming, and/or establishing a connection to a same AP that is connected to the WCD. That is, branch 530-1 may be associated with the second time synchronization procedure. In some aspects, the peripheral device may determine that the AP is shared with the WCD, such as by comparing AP identifiers included in one or more messages received by the peripheral device. As shown by reference number 532, the peripheral device may transmit an XPAN synchronization request message. To illustrate, the peripheral device may transmit the XPAN synchronization request message to the shared AP, and the shared AP may forward, relay, and/or transmit the XPAN synchronization request message to the WCD.

Based at least in part on receiving the XPAN synchronization request message, the WCD may calculate timing synchronization information that is associated with the shared AP as shown by reference number 524. In some aspects, the WCD may calculate the timing synchronization information without performing a time synchronization procedure that includes interactions with the peripheral device. To illustrate, the WCD calculate an estimation of a clock offset based at least in part on historical clock offset information. Alternatively, or additionally, the WCD may calculate timing synchronization information based at least in part on one or more equations as described with regard to FIG. 4. In some aspects, the WCD may calculate timing synchronization information based at least in part on respective timing synchronization information from multiple peripheral devices as described below with regard to FIG. 8.

Based at least in part on calculating the timing synchronization information that is associated with the same AP shared with the peripheral device, the WCD may transmit the timing synchronization information to the peripheral device as shown by reference number 520. In some aspects, the WCD may transmit a first indication of the timing synchronization information to a primary peripheral device and a second indication of the timing synchronization information to a secondary peripheral device as described above. Based at least in part on receiving the timing synchronization information, the peripheral device (e.g., the primary peripheral device and/or the secondary peripheral device) may enable a power saving mode as shown by reference number 522. However, in other aspects, the peripheral device may currently have the power saving mode enabled (and refrain from re-enabling the power saving mode) and/or may refrain from enabling the power saving mode.

Branch 530-2 is associated with a peripheral device transitioning, roaming, and/or establishing a connection to a first AP that is different from a second AP connected to the WCD. In some aspects, the peripheral device may determine that the first AP is different from the second AP as described above. As shown by reference number 534, the peripheral device may determine whether a TSF_est that is local to the peripheral device has been initialized. Based at least in part on determining that the TSF_est is uninitialized, the peripheral device may follow branch 536-1 of the flow diagram. Based at least in part on determining that the TSF_est has been initialized, the peripheral device may follow branch 536-2 of the flow diagram.

Branch 536-1 is associated with an uninitialized TSF_est at the peripheral device. Accordingly, and in a similar manner as described with regard to the first time synchronization procedure, the peripheral device may transmit, and a WCD may receive by way of one or more APs, an XPAN synchronization initialization message as shown by reference number 506. Alternatively, or additionally, the peripheral device may disable a power saving mode as shown by reference number 508. Based at least in part on receiving the XPAN synchronization initialization message, the WCD may determine whether the WCD and the peripheral device are connected to different APs or a same AP as shown by reference number 510. Based at least in part on determining that the WCD and the peripheral device are connected to different APs, the WCD may follow branch 512-1 of the flow diagram as described above. Based at least in part on determining that the WCD and the peripheral device are connected to different APs, the WCD may follow branch 512-2 of the flow diagram as described above.

Branch 536-2 is associated with an initialized TSF_est at the peripheral device. As shown by reference number 538, the peripheral device may calculate and or measure timing synchronization information associated with the AP connected to the peripheral device. To illustrate, the peripheral device may calculate a clock drift and/or a clock offset that is based at least in part on a TSF_AP at the connected AP and a TSF_est at the peripheral device. In some aspects, the TSF_est may be based at least in part on a prior AP connected to the peripheral device. To illustrate, the TSF_est may be based at least in part on a first TSF_AP associated with a first AP disconnected from the peripheral device, and the clock drift and/or the clock offset may be based at least in part on a second TSF_AP associated with a second AP connected to the peripheral device. Alternatively, or additionally, the peripheral device may calculate a clock drift and/or a clock offset that is based at least in part on the second TSF_AP and a local clock at the peripheral device that is based at least in part on the first TSF_AP.

As shown by reference number 540, the peripheral device may transmit, and the WCD may receive by way of two or more APs, an XPAN synchronization measurement message. In some aspects, the XPAN synchronization measurement message indicates the timing synchronization information calculated by the peripheral device.

Based at least in part on receiving the XPAN synchronization measurement message, the WCD may calculate updated timing synchronization information. In some aspects, the updated timing synchronization information may indicate a clock drift and/or a clock offset between a TSF_soft at the WCD and a TSF_est at the peripheral device. For example, the WCD may calculate the updated timing synchronization information based at least in part on the timing synchronization information from the peripheral device. As described below with regard to FIG. 8, the WCD may calculate the updated timing synchronization information based at least in part on respective timing synchronization information from multiple peripheral devices. Alternatively, or additionally, the WCD may calculate the updated timing synchronization information based at least in part on historical clock offset and/or one or more equations as described with regard to FIG. 4. In some aspects, the WCD may enable the power saving mode as shown by reference number 518 and/or transmit the updated timing synchronization information to the peripheral device as shown by reference number 520. To illustrate, the WCD may transmit an XPAN synchronization time message that indicates the updated timing synchronization information. Based at least in part on receiving the timing synchronization information, the peripheral device may enable a power saving mode as shown by reference number 522. Alternatively, or additionally, the peripheral device may initialize and/or update a local clock based at least in part on the updated timing synchronization information. In some aspects, the peripheral device may update a TSF_est based at least in part on the updated timing synchronization information.

For clarity, aspects of the example 500 describe a time synchronization procedure between a WCD that is connected to a peripheral device by way of one or more AP. However, various aspects of the time synchronization procedure may be applied to a WCD that is simultaneously connected to multiple peripheral devices and/or a peripheral device that is simultaneously connected to multiple WCDs. To illustrate, a WCD may be connected to two or more peripheral devices (e.g., a peripheral device group) during a same time span, such as multiple wireless speakers, multiple headsets, and/or multiple earbuds. Alternatively, or additionally, a peripheral device may be connected to multiple WCDs, such as an earbud that maintains (e.g., during a same time span) a first connection to a first WCD (e.g., a mobile phone) and/or a second connection to a second WCD (e.g., a tablet). In some aspects, the WCD and/or the peripheral device may perform separate instances of the time synchronization procedure for respective connections.

By connecting to a same AP and using a timing base associated with the AP as a common network clock, peripheral devices in a peripheral device pair may maintain synchronization with one another without performing a synchronization procedure with one another. That is, each peripheral device may initialize a respective local clock using a same time base from the AP. Each peripheral device synchronizing to the AP clock as a common network clock may result in more robust and/or stable playback by the peripheral device pair based at least in part on reducing a size of skew between the peripheral devices. Alternatively, or additionally, a WCD may calculate timing synchronization information that mitigates misalignment between a TTP software clock at the WCD (e.g., a TSF_soft) with the estimated TTP software clock at the peripheral device pair. Mitigating time misalignment between the WCD and a peripheral device may increase audio playback quality by the peripheral device pair, such as by producing audio playback that has negligible timing differences and/or audio playback differences that are unnoticed by a listener.

As indicated above, FIG. 5 is provided as an example. Other examples may differ from what is described with regard to FIG. 5.

Figure 6:
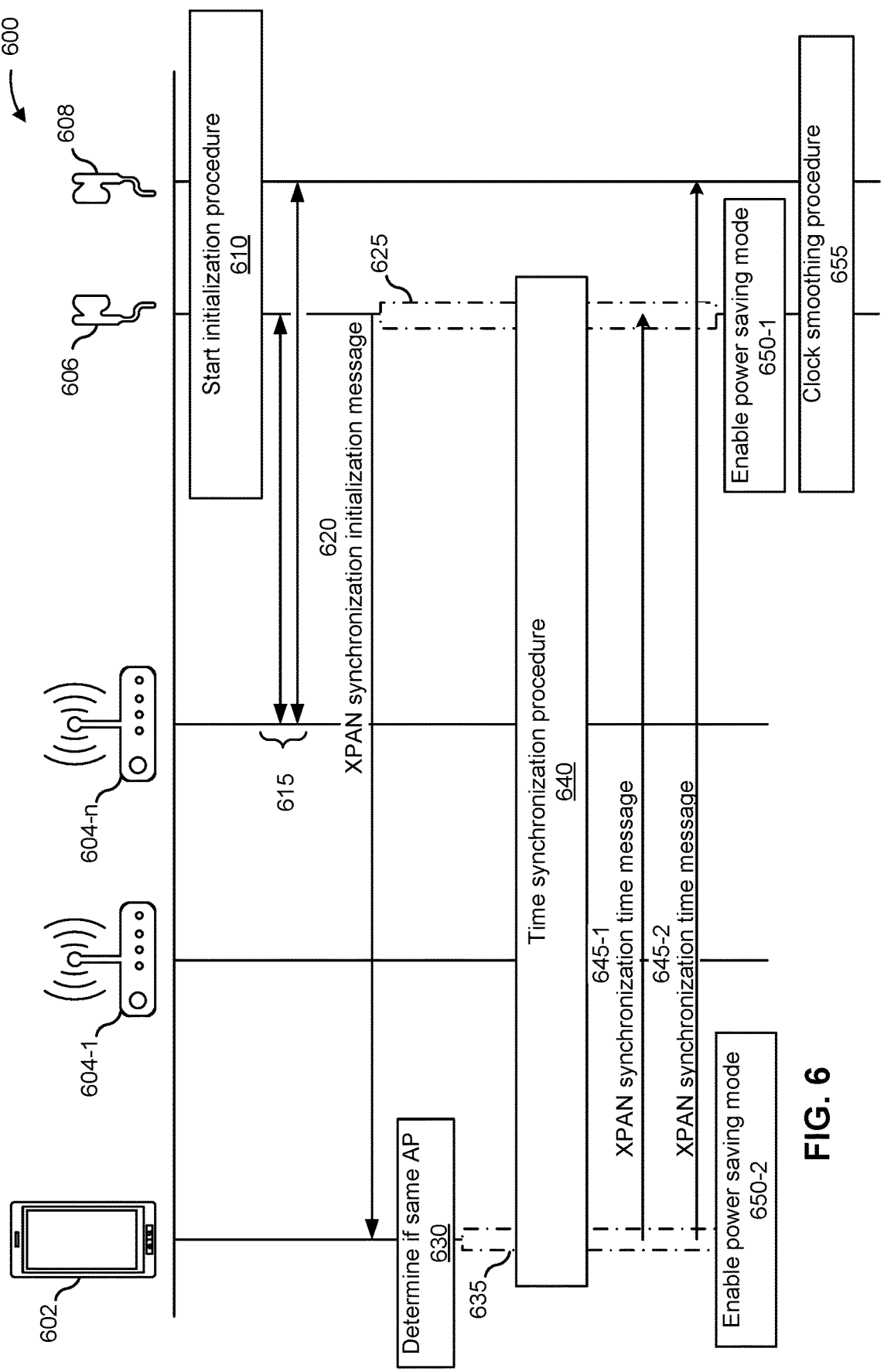
FIG. 6 is a diagram illustrating an example of a wireless communication process between a WCD, one or more APs, a primary peripheral device, and a secondary peripheral device, in accordance with the present disclosure.

FIG. 6 is a diagram illustrating an example 600 of a wireless communication process between a WCD 602 (e.g., a first device 115, a first device 1200, the WCD 402, and/or a device 1200), a first AP 604-1, an n-th AP 604-*n* (e.g., one or more APs 105, where n is an integer), a primary peripheral device 606 (e.g., a second device 115, a second device 1200, the wireless earbud 130-*a*, and/or the wireless earbud 130-*b*), and a secondary peripheral device 608 (e.g., a third device 115, a third device 1200, the wireless earbud 130-*a*, and/or the wireless earbud 130-*b*), in accordance with the present disclosure. In some aspects, the wireless communication process shown by FIG. 6 may be used as at least part of the first time synchronization procedure described with regard to FIG. 5.

As shown by reference number 610, a primary peripheral device 606 and a secondary peripheral device 608 may start an initialization process. As one example, the primary peripheral device 606 and/or the secondary peripheral device 608 may detect removal from a housing case. To illustrate, the primary peripheral device 606 and/or the secondary peripheral device 608 may detect motion (e.g., via a sensor), may detect a change in a charging voltage, and/or may detect activation of an on-off button. Based at least in part on detecting removal from the housing case, the primary peripheral device 606 and/or the secondary peripheral device 608 may start the initialization process, and the initialization process may be associated with establishing a wireless connection to the WCD 602 and/or an AP.

As shown by reference number 615, the primary peripheral device 606 and the secondary peripheral device 608 may connect to an n-th AP 604-*n*. That is, the primary peripheral device 606 and the secondary peripheral device 608 may establish a respective connection to a same AP. As described above, the connection between the primary peripheral device 606 and the n-th AP 604-*n* may be a first wireless link, and the connection between the secondary peripheral device 608 and the n-th AP 604-*n* may be a second wireless link.

As shown by reference number 620, the primary peripheral device 606 may transmit, and the WCD 602 may receive, an XPAN synchronization initialization message. As shown by FIG. 6, the primary peripheral device 606 may transmit the XPAN synchronization initialization message indirectly to the WCD 602, such as by transmitting the XPAN synchronization initialization message to the n-th AP 604-*n* that is connected to the primary peripheral device 606, the n-th AP 604-*n* transmitting the XPAN synchronization initialization message to a first AP 604-1 that is connected to the WCD 602, and the first AP 604-1 transmitting the XPAN synchronization initialization message to the WCD 602. The primary peripheral device 606 may address the XPAN synchronization initialization message to the WCD 602.

That is, the XPAN synchronization initialization message may indicate that the WCD 602 is an intended recipient of the message.

As shown by reference number 625 and through the use of a dash-dot line, the primary peripheral device 606 may disable a power saving mode. In some aspects, the primary peripheral device 606 may disable a power saving mode based at least in part on determining to perform a time synchronization procedure.

As shown by reference number 630, the WCD 602 may determine if the primary peripheral device 606 is connected to a same AP as the WCD 602. For instance, the WCD 602 may analyze and/or compare AP identifiers as described above. In the example 600, the WCD 602 determines that the primary peripheral device 606 is connected to a different AP than the WCD 602. However, in other examples and as described with regard to FIG. 5, the WCD 602 may determine that the primary peripheral device 606 is connected to a same AP as the WCD 602.

As shown by reference number 635 and through the use of a dash-dot line, the WCD 602 may disable a power saving mode. As one example, the WCD 602 may disable the power saving mode based at least in part on determining that the primary peripheral device 606 is connected to a different AP than the WCD 602 and/or based at least in part on determining to perform a time synchronization procedure (e.g., the first time synchronization procedure described with regard to FIG. 5).

As shown by reference number 640, the WCD 602 and the primary peripheral device 606 may perform a time synchronization procedure, such as that described with regard to FIG. 4. To illustrate, and as part of the time synchronization procedure, the WCD 602 may transmit an XPAN synchronization message to the primary peripheral device 606 (e.g., by way of one or more APs). The primary peripheral device 606 may transmit an XPAN synchronization response message to the WCD 602 (e.g., by way of one or more APs). Alternatively, or additionally, the primary peripheral device 606 may transmit an XPAN synchronization follow-up message to the WCD 602 (e.g., by way of one or more APs). In some aspects, the WCD 602 and the primary peripheral device 606 may iteratively perform the time synchronization procedure. As one example, the WCD 602 may trigger the time synchronization procedure based at least in part on detecting that a clock offset and/or a clock drift satisfies a trigger threshold. As another example, the WCD 602 and/or the primary peripheral device 606 may trigger the time synchronization procedure based at least in part on detecting that the primary peripheral device 606 has changed an AP connection. As described above, the WCD 602 may calculate timing synchronization information as part of the time synchronization procedure.

As shown by reference number 645-1, the WCD 602 may transmit, and the primary peripheral device 606 may receive, a first XPAN synchronization time message that indicates the timing synchronization information. Alternatively, or additionally, and as shown by reference number 645-2, the WCD 602 may transmit, and the secondary peripheral device 608 may receive, a second XPAN synchronization time message that indicates the timing synchronization information. The first XPAN synchronization time message may be addressed to the primary peripheral device 606, and the second XPAN synchronization time message may be addressed to the secondary peripheral device 608. As described above, the WCD 602 may transmit the first XPAN synchronization time message and/or the second XPAN synchronization time message to the respective peripheral device by way of one or more APs (e.g., the first AP 604-1 and the n-th AP 604-n). Based at least in part on transmitting the first XPAN synchronization time message and/or the second XPAN synchronization time message, the WCD 602 may enable the power saving mode as described above.

As shown by reference number 650-1, the primary peripheral device 606 may enable a power saving mode. Alternatively, or additionally, as shown by reference number 650-2, the WCD 602 may enable a power saving mode. For instance, the primary peripheral device 606 may determine that the time synchronization procedure has been completed based at least in part on receiving the XPAN synchronization time message and may determine to enable the power saving mode as described above. Alternatively, or additionally, the WCD 602 may determine that the time synchronization procedure has been completed and may determine to enable the power saving mode.

As shown by reference number 655, the primary peripheral device 606 and the secondary peripheral device 608 may perform a clock smoothing procedure. As one example, the primary peripheral device 606 and the secondary peripheral device 608 may establish a peer-to-peer (P2P) communication link with one another. In some aspects, the primary peripheral device 606 may transmit, and the secondary peripheral device 608 may receive, an indication to synchronize a transition from using a first TSF_est at the secondary peripheral device to a second TSF_est that is based at least in part on a TSF_AP.

For clarity, aspects of the example 600 describe a wireless communication process between a WCD that is connected to a peripheral device pair (e.g., a primary peripheral device and a secondary peripheral device pair) by way of one or more AP. However, various aspects of the wireless communication process may be applied to a WCD that is simultaneously connected to multiple peripheral devices (e.g., as part of a peripheral device group and/or multiple independent peripheral devices) and/or a peripheral device that is simultaneously connected to multiple WCDs. In some aspects, the WCD and/or the peripheral device may perform separate instances of the wireless communication process for the respective connections.

As indicated above, FIG. 6 is provided as an example. Other examples may differ from what is described with regard to FIG. 6.

Figure 7:
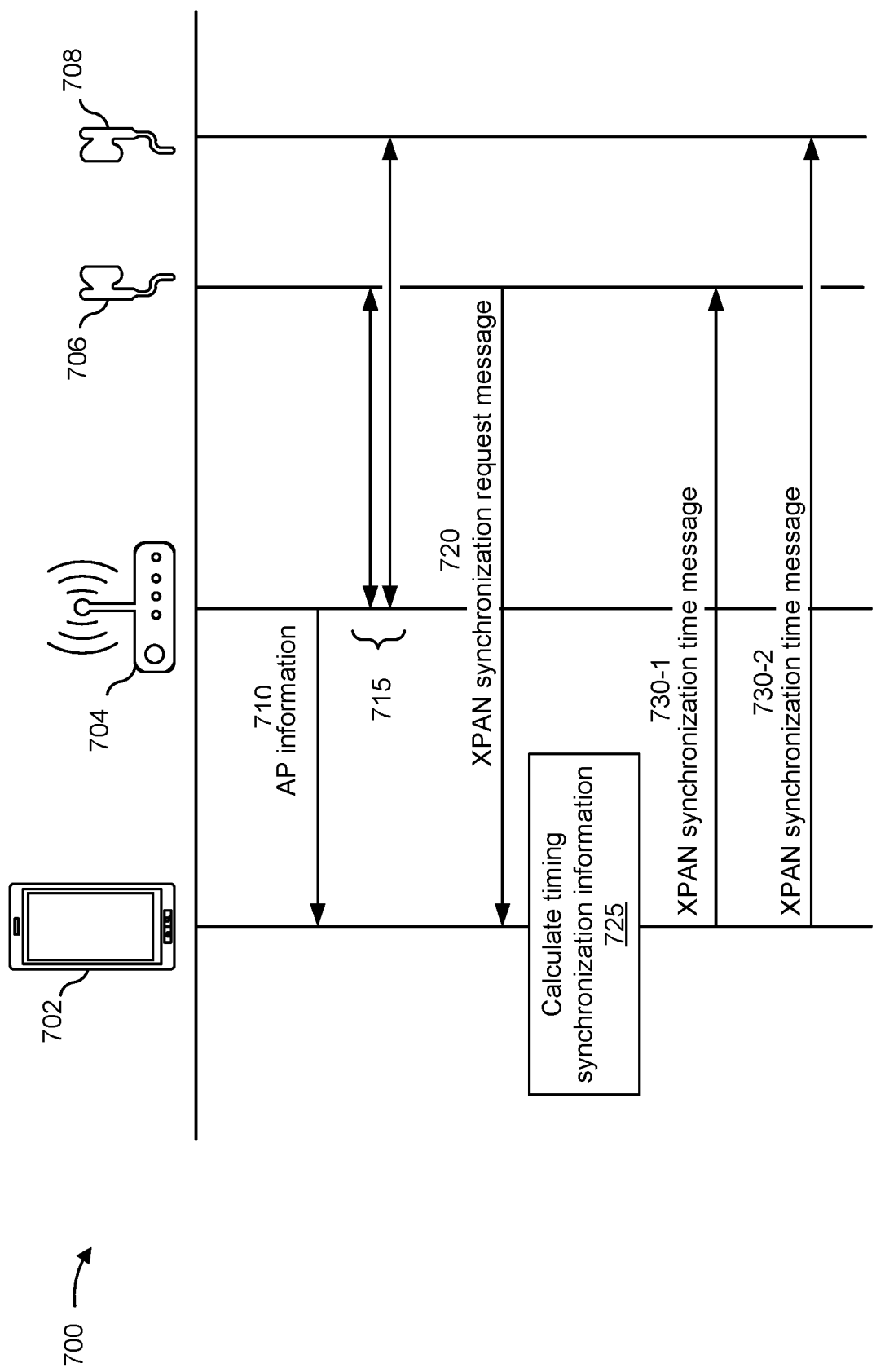
FIG. 7 is a diagram illustrating an example of a wireless communication process between a WCD, an AP, a primary peripheral device, and a secondary peripheral device, in accordance with the present disclosure.

FIG. 7 is a diagram illustrating an example 700 of a wireless communication process between a WCD 702 (e.g., a first device 115, a device 1200, the WCD 402, and/or the WCD 602), an AP 704, a primary peripheral device 706 (e.g., a second device 115, a second device 1200, the wireless earbud 130-a, and/or the wireless earbud 130-b), and a secondary peripheral device 708 (e.g., a third device 115, a third device 1200, the wireless earbud 130-a, and/or the wireless earbud 130-b), in accordance with the present disclosure. In some aspects, the wireless communication process shown by FIG. 7 may be used as at least part of the second time synchronization procedure described with regard to FIG. 5. As described with regard to FIG. 2, the primary peripheral device 706 and the secondary peripheral device 708 may be associated with the WCD 702.

As shown by reference number 710, an AP 704 may transmit, and a WCD 702 may receive AP information. To illustrate, the AP 704 may indicate an AP identifier (ID) that is associated with the AP 704.

As shown by reference number 715, the primary peripheral device 706 and/or the secondary peripheral device 708 may establish a respective connection to the AP 704. As one example, the primary peripheral device 706 and/or the secondary peripheral device 708 may change locations and determine that a signal from the AP 704 has a higher received power level relative to a current AP that is connected to the primary peripheral device 706 and/or the secondary peripheral device 708. Accordingly, the primary peripheral device 706 and/or the secondary peripheral device 708 may disconnect from the current AP and establish a respective connection to the AP 704. As described above, the connection between the primary peripheral device 706 and the AP 704 may be a first wireless link, and the connection between the secondary peripheral device 708 and the AP 704 may be a second wireless link.

As shown by reference number 720, the primary peripheral device 706 may transmit, and the WCD 702 may receive, an XPAN synchronization request message. In some aspects, the primary peripheral device 706 may determine that the WCD 702 is connected to a same AP (e.g., the AP 704) as the primary peripheral device 706. Based at least in part on determining that the WCD is connected to the same AP, the primary peripheral device 706 may transmit the XPAN synchronization request message to the WCD 702. For instance, the primary peripheral device 706 may transmit the XPAN synchronization request message to the AP 704, and the XPAN synchronization request message may be addressed to the WCD 702. Accordingly, the AP 704 may forward, relay, and/or transmit the XPAN synchronization request message to the WCD 702.

As shown by reference number 725, the WCD 702 may calculate timing synchronization information that is associated with the AP 704, such as a clock drift metric and/or a clock offset metric. In some aspects, the WCD 702 may calculate the timing synchronization information without performing a time synchronization procedure that is associated with transmitting a message to and/or receiving a message from the primary peripheral device 706. Alternatively, or additionally, the WCD 702 may update a clock at the WCD based at least in part on the timing synchronization information.

As shown by reference number 730-1, the WCD 702 may transmit, and the primary peripheral device 706 may receive, a first XPAN synchronization time message that indicates the timing synchronization information. Alternatively, or additionally, and as shown by reference number 730-2, the WCD 702 may transmit, and the secondary peripheral device 708 may receive, a second XPAN synchronization time message that indicates the timing synchronization information. The first XPAN synchronization time message may be addressed to the primary peripheral device 706, and the second XPAN synchronization time message may be addressed to the secondary peripheral device 708. As described above, the WCD 702 may transmit the first XPAN synchronization time message and/or the second XPAN synchronization time message to the respective peripheral device based at least in part on using the AP 704.

For clarity, aspects of the example 700 describe a wireless communication process between a WCD that is connected to a peripheral device pair (e.g., a primary peripheral device and a secondary peripheral device pair) by way of one or more AP. However, various aspects of the wireless communication process may be applied to a WCD that is simultaneously connected to multiple peripheral devices (e.g., as part of a peripheral device group and/or multiple independent peripheral devices) and/or a peripheral device that is simultaneously connected to multiple WCDs. In some aspects, the WCD and/or the peripheral device may perform separate instances of the wireless communication process for the respective connections.

As indicated above, FIG. 7 is provided as an example. Other examples may differ from what is described with regard to FIG. 7.

Figure 8:
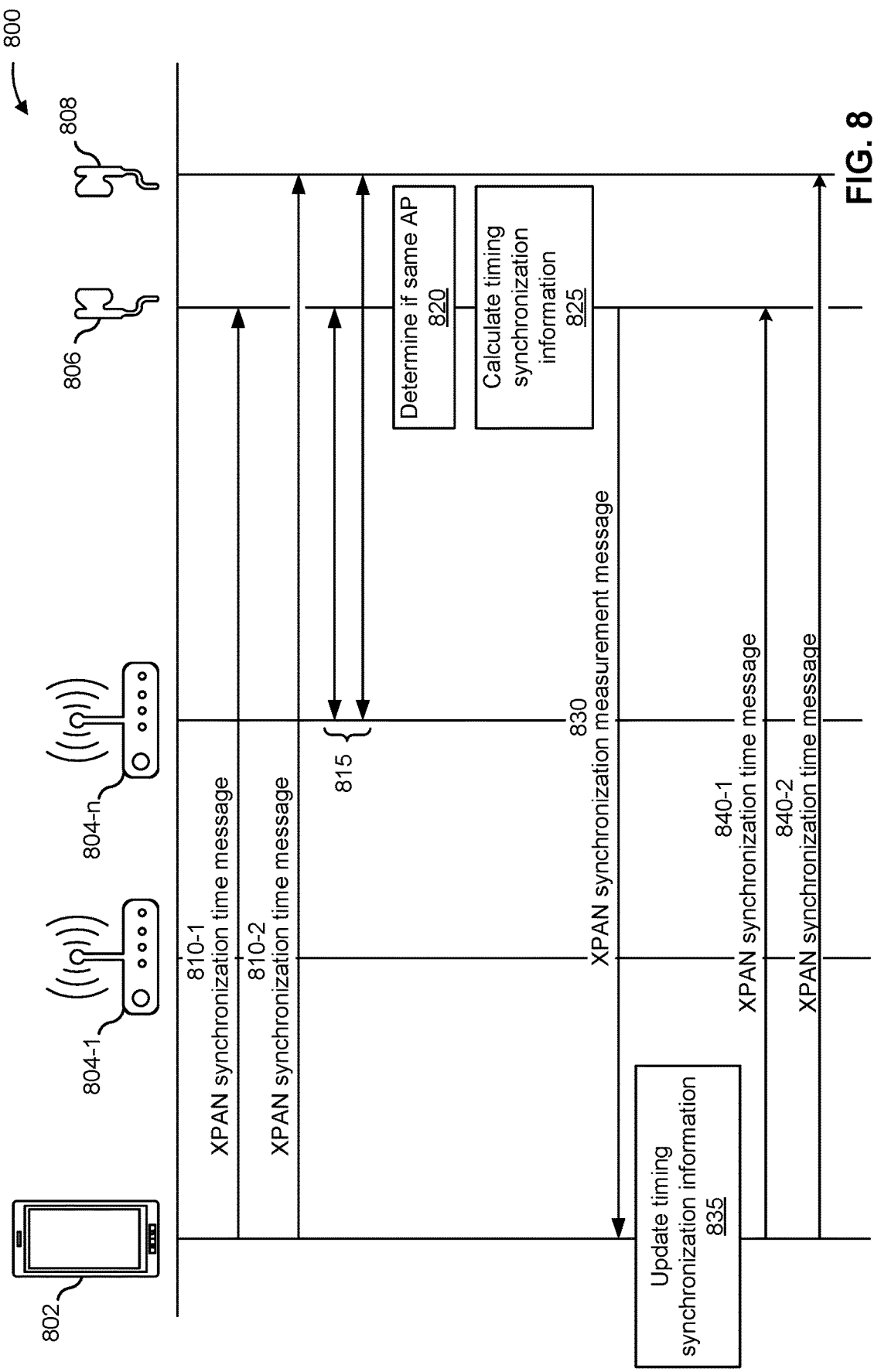
FIG. 8 is a diagram illustrating an example of a wireless communication process between a WCD, one or more APs, a primary peripheral device, and a secondary peripheral device, in accordance with the present disclosure.

FIG. 8 is a diagram illustrating an example 800 of a wireless communication process between a WCD 802 (e.g., a first device 115, a device 1200, the WCD 402, the WCD 602, and/or the WCD 702), a first AP 804-1, an n-th AP 804-*n* (e.g., one or more APs 105, where n is an integer), a primary peripheral device 806 (e.g., a second device 115, the wireless earbud 130-*a*, and/or the wireless earbud 130-*b*), and a secondary peripheral device 808 (e.g., a third device 115, the wireless earbud 130-*a*, and/or the wireless earbud 130-*b*), in accordance with the present disclosure.

As shown by reference number 810-1, the WCD 802 may transmit, and the primary peripheral device 806 may receive, an XPAN synchronization time message that indicates first timing synchronization information. Alternatively, or additionally, and as shown by reference number 810-2, the WCD 802 may transmit, and the secondary peripheral device 808 may receive, an XPAN synchronization time message that indicates the first timing synchronization information. In some aspects, the first timing synchronization is based at least in part on a current AP (e.g., not the first AP 804-1 and not the n-th AP 804-*n*) that is connected to the primary peripheral device 806 and the secondary peripheral device 808. As described above, the WCD 802 may transmit the respective XPAN synchronization time messages to the respective peripheral devices based at least in part on using one or more APs.

As shown by reference number 815, the primary peripheral device 806 and the secondary peripheral device 808 may establish a connection with the n-th AP 804-*n*. To illustrate, the primary peripheral device 806 and/or the secondary peripheral device 808 may change locations and determine that a signal from the n-th AP 804-*n* has a higher received power level relative to the current AP that is connected to the primary peripheral device 806 and/or the secondary peripheral device 808. Accordingly, the primary peripheral device 806 and/or the secondary peripheral device 808 may disconnect from the current AP and establish a respective connection to the n-th AP 804-*n*. As described above, the connection between the primary peripheral device 806 and the n-th AP 804-*n* may be a first wireless link, and the connection between the secondary peripheral device 808 and the n-th AP 804 may be a second wireless link.

As shown by reference number 820, the primary peripheral device 806 may determine if the n-th AP 804-*n* is a same AP that is connected to the WCD 802. For instance, the primary peripheral device 806 may compare AP identifiers as described above.

As shown by reference number 825, and based at least in part on determining that the n-th AP 804-*n* is a different AP than the AP connected to the WCD 802 (e.g., the first AP 804-1), the primary peripheral device 806 may calculate timing synchronization information that is associated with the n-th AP 804-*n*. For instance, the primary peripheral device 806 may calculate a relative clock drift metric and/or a relative clock offset metric as described above.

To illustrate, in changing locations, the primary peripheral device 806 and/or the secondary peripheral device 808 may change AP connections and, subsequently, AP clock domains. For instance, and as described with regard to reference number 538 of FIG. 5, the primary peripheral device 806 and/or the secondary peripheral device 808 may calculate a first respective TSF_est that is associated with a first AP clock domain (e.g., a first TSF_AP) based at least in part on a connection to a first AP (any AP of the APs 804-1 to 804-*n*). Based at least in part on disconnecting from the first AP and establishing a connection to a second AP (e.g., another AP of the APs 804-1 to 804-*n*) that is associated with a second AP clock domain (e.g., a second TSF_AP), the primary peripheral device 806 and/or the secondary peripheral device 808 may calculate a clock drift and/or a clock offset that is associated with the second AP and/or the second TSF_AP based at least in part on using the first respective TSF_est as described with regard to reference number 538. That is, the primary peripheral device 806 and/or the secondary peripheral device 808 may calculate the clock drift and/or the clock offset based at that is associated with a second AP based at least in part on the first respective TSF_est (e.g., that is based at least in part on the first TSF_AP) and the second TSF_AP. Alternatively, or additionally, the primary peripheral device 806 and/or the secondary peripheral device 808 may calculate a timing difference between the first TSF_AP and the second TSF_AP, and use the timing difference to calculate the clock drift and/or clock offset that is associated with the second TSF_AP. For example, the primary peripheral device 806 and/or the secondary peripheral device 808 may apply the timing difference to a clock drift and/or a clock offset that is associated with the first TSF_AP.

Alternatively, or additionally, the primary peripheral device 806 and the secondary peripheral device 808 may calculate the timing synchronization information based at least in part on receiving timing information from the WCD 802 as described below with regard to reference number 840-1 and reference number 840-2. For instance, the WCD 802 may identify that the primary peripheral device 806 and/or the secondary peripheral device 808 have changed (or will change) AP connections as described above, such as through the use of one or more AP identifiers. In some aspects, the WCD 802 may have prior timing synchronization information associated with the second AP (e.g., the new AP connection) that the primary peripheral device 806 and/or the secondary peripheral device 808 is connected to (and/or will connect to). Accordingly, the WCD 802 may transmit an indication of the timing synchronization information that is associated with the second AP as described with the regard to reference number 840-1 and reference number 840-2, and the primary peripheral device 806 and/or the secondary peripheral device 808 may use the timing synchronization information to calculate a clock drift and/or clock offset that is associated with the second AP.

As shown by reference number 830, the primary peripheral device 806 may transmit, and the WCD 802 may receive, an XPAN synchronization measurement message. In some aspects, the XPAN synchronization measurement message indicates the timing synchronization information (e.g., the relative clock drift metric and/or the relative clock offset metric) calculated by the primary peripheral device as described with regard to reference number 825. As shown by FIG. 8, the primary peripheral device 806 may transmit the XPAN synchronization measurement message based at least in part on using one or more APs (e.g., the first AP 804-1 and the n-th AP 804-*n*).

As shown by reference number 835, the WCD 802 may calculate updated timing synchronization information based at least in part on receiving the XPAN synchronization measurement message. As one example, the WCD 802 may calculate the updated timing synchronization information based at least in part on a relative clock drift metric and/or a relative clock offset metric.

As shown by reference number 840-1, the WCD 802 may transmit, and the primary peripheral device 806 may receive, an XPAN synchronization time message that indicates the updated timing synchronization information. Alternatively, or additionally, and as shown by reference number 840-2, the WCD 802 may transmit, and the secondary peripheral device 808 may receive, an XPAN synchronization time message that indicates the updated timing synchronization information. As described above, the WCD 802 may transmit the respective XPAN synchronization time messages to the respective peripheral device based at least in part on using one or more APs. Alternatively, or additionally, the WCD 802 may transmit the updated timing synchronization information to one or more other peripheral devices that are connected to the same AP as the primary peripheral device 806 and/or the secondary peripheral device 808. For example, the WCD 802 may transmit the updated timing synchronization information to a peripheral device group that includes multiple wireless speakers that are connected to a same AP and/or multiple wireless headsets that are connected to a same AP. In other examples, the WCD 802 may transmit the updated timing synchronization information to peripheral devices that are connected to a same AP and independent of whether the peripheral devices being included in a same peripheral device pair and/or peripheral device group. According, the WCD 802 may obtain updated timing synchronization information from a first peripheral device and forward the updated timing synchronization information to multiple different peripheral devices (e.g., in a peripheral device pair, in a peripheral device group, and/or connected to a same AP).

In some aspects, the WCD 802 may calculate the timing synchronization information based at least in part on multiple values and/or multiple signalling exchanges with multiple peripheral devices (e.g., peripheral device pairs, peripheral device groups, and/or unrelated peripheral devices). To illustrate, the WCD 802 may calculate a respective clock drift and/or respective clock offset based at least in part on respective signalling exchanges with each peripheral device of multiple peripheral devices. The WCD 802 may calculate the timing synchronization information based at least in part on the respective clock drifts and/or respective clock offsets, such as by averaging the respective clock drifts and/or the respective clock offsets, selecting a median value from a set (e.g., a median clock drift value and/or a media clock offset value), and/or by calculating a weighted average of the respective clock drifts and/or the respective clock offsets.

As one non-limiting example, the WCD 802 may stream user data to a peripheral device pair, such as high-fidelity audio to a pair of wireless earbuds (e.g., the wireless earbud 130-*a* and the wireless earbud 130-*b*). In some aspects, each peripheral device may observe different channel conditions. To illustrate, a user may wear a pair of wireless earbuds, and a position, size, and/or location of the user's head may result in significant deterioration in a channel performance observed by a first wireless earbud in the pair (but not the second wireless earbud in the pair). Accordingly, the first wireless earbud and the second wireless earbud may observe and/or calculate different timing metrics (e.g., clock drift and/or clock offset). In some aspects, a device (e.g., a peripheral device and/or a WCD) may rank N timing measurements, and select a subset of M timing measurements from the total N timing measurement, where N and M are integers. For instance, the device select the subset of M timing measurements based at least in part on an amount of change between successive measurements. To further explain, a second timing measurement that differs from a first timing measurement by at least a threshold may be discarded and/or excluded from the subset of M timing measurements. Accordingly, the device may select the subset of M timing measurements based at least in part on excluding and/or discarding timing measurements that satisfy a maximum change threshold (e.g., a maximum clock offset change threshold and/or a maximum clock drift change threshold).

For clarity, aspects of the example 800 describe a wireless communication process between a WCD that is connected to a peripheral device pair (e.g., a primary peripheral device and a secondary peripheral device pair) by way of one or more AP. However, various aspects of the wireless communication process may be applied to a WCD that is simultaneously connected to multiple peripheral devices (e.g., as part of a peripheral device group and/or multiple independent peripheral devices) and/or a peripheral device that is simultaneously connected to multiple WCDs. In some aspects, the WCD and/or the peripheral device may perform separate instances of the wireless communication process for the respective connections.

As indicated above, FIG. 8 is provided as an example. Other examples may differ from what is described with regard to FIG. 8.

Figure 9:
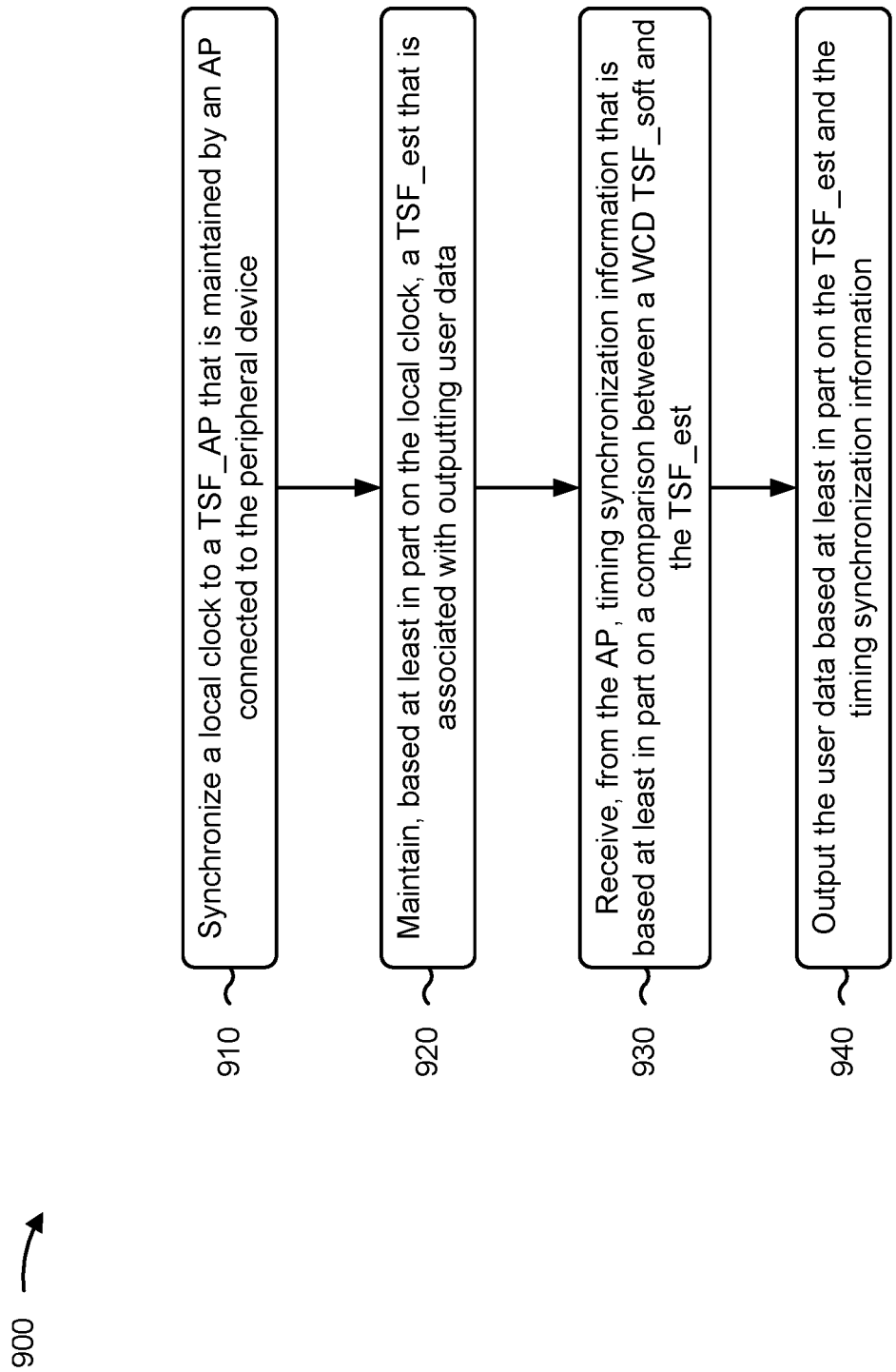
FIG. 9 is a diagram illustrating an example process performed, for example, by a peripheral device, in accordance with the present disclosure.

FIG. 9 is a diagram illustrating an example process 900 performed, for example, by a peripheral device, in accordance with the present disclosure. Example process 900 is an example where the peripheral device (e.g., a device 115, a wireless earbud 130-*a*, a wireless earbud 130-*b*, and/or a device 1200) performs operations associated with time synchronizing a wireless communication device and a peripheral device based on a link that uses one or more access points.

As shown in FIG. 9, in some aspects, process 900 may include synchronizing a local clock to a TSF_AP that is maintained by an AP connected to the peripheral device (block 910). For example, the peripheral device (e.g., using communication manager 140, depicted in FIG. 11) may synchronize a local clock to a TSF_AP that is maintained by an AP connected to the peripheral device, as described above.

As further shown in FIG. 9, in some aspects, process 900 may include maintaining, based at least in part on the local clock, a TSF_est that is associated with outputting user data (block 920). For example, the peripheral device (e.g., using communication manager 140, depicted in FIG. 11) may maintain, based at least in part on the local clock, a TSF_est that is associated with outputting user data, as described above.

As further shown in FIG. 9, in some aspects, process 900 may include receiving, from the AP, timing synchronization information that is based at least in part on a comparison between a WCD TSF_soft and the TSF_est (block 930). For example, the peripheral device (e.g., using reception component 1102 and/or communication manager 140, depicted in FIG. 11) may receive, from the AP, timing synchronization information that is based at least in part on a comparison between a WCD TSF_soft and the TSF_est, as described above.

As further shown in FIG. 9, in some aspects, process 900 may include outputting the user data based at least in part on the TSF_est and the timing synchronization information (block 940). For example, the peripheral device (e.g., using transmission component 1104 and/or communication manager 140, depicted in FIG. 11) may output the user data based at least in part on the TSF_est and the timing synchronization information, as described above.

Process 900 may include additional aspects, such as any single aspect or any combination of aspects described below and/or in connection with one or more other processes described elsewhere herein.

In a first aspect, the user data includes audio data that is associated with an audio frame that is based at least in part on the WCD TSF_soft.

In a second aspect, the peripheral device is a first peripheral device included in a peripheral device pair that includes a second peripheral device, and process 900 includes using the TSF_AP as a common network clock that is shared with the second peripheral device.

In a third aspect, using the TSF_AP as the common network clock includes refraining from performing a synchronization procedure with the second peripheral device.

In a fourth aspect, using the TSF_AP as the common network clock includes maintaining synchronization with the second peripheral device based at least in part on the TSF_AP.

In a fifth aspect, the timing synchronization information includes at least one of a clock drift metric that is based at least in part on the WCD TSF_soft and the TSF_AP, or a clock offset metric that is based at least in part on the WCD TSF_soft and the TSF_AP.

In a sixth aspect, process 900 includes converting an audio frame timing reference that is based at least in part on the WCD TSF_soft to a local audio frame timing reference that is based at least in part on the TSF_est and the timing synchronization information, and outputting the user data based at least in part on the TSF_est and the timing synchronization information includes outputting the user data based at least in part on the local audio frame timing reference.

In a seventh aspect, process 900 includes performing an XPAN synchronization procedure with the WCD, and the timing synchronization information is based at least in part on the synchronization procedure.

In an eighth aspect, performing the synchronization procedure includes receiving, from the AP, an XPAN synchronization message that indicates that the WCD is a source of the XPAN synchronization message, and transmitting, to the AP, an XPAN synchronization response message that is addressed to the WCD.

In a ninth aspect, receiving the timing synchronization information includes receiving, from the AP, an XPAN synchronization time message.

In a tenth aspect, process 900 includes transmitting an XPAN synchronization initialization message, disabling a power saving mode, and performing an XPAN synchronization procedure that is based at least in part on the WCD, and the timing synchronization information is based at least in part on the XPAN synchronization procedure.

In an eleventh aspect, the peripheral device is a first peripheral device in a peripheral device pair, and process 900 includes performing a clock smoothing procedure based at least in part on communicating with a second peripheral device in the peripheral device pair.

In a twelfth aspect, process 900 includes enabling the power saving mode based at least in part on completion of the XPAN synchronization procedure.

In a thirteenth aspect, process 900 includes transmitting an XPAN synchronization initialization message, disabling a power saving mode, receiving an XPAN synchronization time message that indicates the timing synchronization information, and enabling the power saving mode.

In a fourteenth aspect, process 900 includes receiving an indication that the WCD is connected to the AP connected to the peripheral device, disabling a power saving mode, transmitting an XPAN synchronization request message, and receiving an XPAN synchronization time message that indicates the timing synchronization information.

In a fifteenth aspect, the XPAN synchronization time message is a second XPAN synchronization time message, and receiving the indication that the WCD is connected to the AP connected to the peripheral device includes receiving, prior to receiving the second XPAN synchronization time message, a first XPAN synchronization time message that indicates that the WCD is connected to the AP connected to the peripheral device.

In a sixteenth aspect, the AP is a first AP, the timing synchronization information is first timing synchronization information, and process 900 includes receiving an indication that the WCD is connected to a second AP that is different from the first AP, calculating second timing synchronization information that is based at least in part on the peripheral device and the first AP, transmitting an XPAN synchronization measure message that indicates the second timing synchronization information, and receiving an XPAN synchronization time message that indicates the first timing synchronization information.

In a seventeenth aspect, calculating the second timing synchronization information is based at least in part on the TSF_est being initialized.

In an eighteenth aspect, the AP is a first AP, and process 900 includes receiving, prior to initialization of the TSF_est, an indication that the WCD is connected to a second AP that is different from the first AP, transmitting an XPAN synchronization initialization message based at least in part on TSF_est being uninitialized, disabling a power saving mode, performing an XPAN synchronization procedure, receiving an XPAN synchronization time message that indicates the timing synchronization information, and enabling the power saving mode.

In a nineteenth aspect, the AP is a first AP, the TSF_AP is a first TSF_AP, the TSF_est is a first TSF_est, and process 900 includes disconnecting from the first AP; connecting to a second AP that is associated with a second TSF_AP; synchronizing the local TSF to the second TSF_AP; maintaining a second TSF_est based at least in part on the second TSF_AP; and outputting the user data based at least in part on the second TSF_est.

In a twentieth aspect, process 900 includes updating the timing synchronization information based at least in part on the second TSF_AP and the first TSF_est, and outputting the user data is based at least in part on the updated timing synchronization information.

In a twenty-first aspect, process 900 includes receiving updated timing synchronization information, wherein outputting the user data is based at least in part on the updated timing synchronization information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
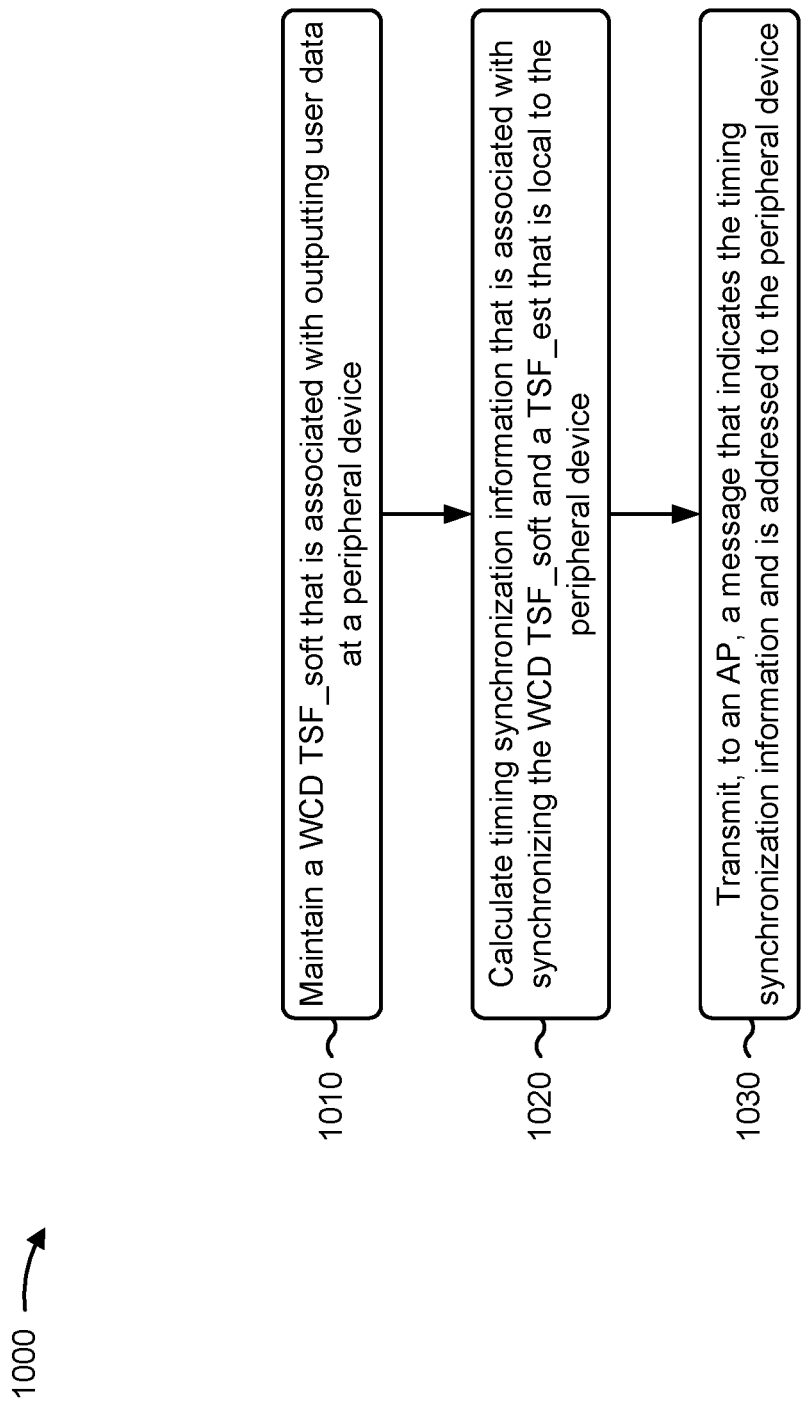
FIG. 10 is a diagram illustrating an example process performed, for example, by a WCD, in accordance with the present disclosure.

FIG. 10 is a diagram illustrating an example process 1000 performed, for example, by a WCD, in accordance with the present disclosure. Example process 1000 is an example where the WCD (e.g., a device 115 and/or a device 1200) performs operations associated with time synchronizing a WCD and a peripheral device based on a link that uses one or more access points.

As shown in FIG. 10, in some aspects, process 1000 may include maintaining a WCD TSF_soft that is associated with outputting user data at a peripheral device (block 1010). For example, the WCD (e.g., using communication manager 140, depicted in FIG. 11) may maintain a WCD TSF_soft that is associated with outputting user data at a peripheral device, as described above.

As further shown in FIG. 10, in some aspects, process 1000 may include calculating timing synchronization information that is associated with synchronizing the WCD TSF_soft and a TSF_est that is local to the peripheral device (block 1020). For example, the WCD (e.g., using communication manager 140, depicted in FIG. 11) may calculate timing synchronization information that is associated with synchronizing the WCD TSF_soft and a TSF_est that is local to the peripheral device, as described above.

As further shown in FIG. 10, in some aspects, process 1000 may include transmitting, to an AP, a message that indicates the timing synchronization information and is addressed to the peripheral device (block 1030). For example, the WCD (e.g., using transmission component 1104 and/or communication manager 140, depicted in FIG. 11) may transmit, to an AP, a message that indicates the timing synchronization information and is addressed to the peripheral device, as described above.

Process 1000 may include additional aspects, such as any single aspect or any combination of aspects described below and/or in connection with one or more other processes described elsewhere herein.

In a first aspect, the peripheral device is a first peripheral device in a peripheral device pair, the message is a first message, and process 1000 includes transmitting, to the AP, a second message that indicates the timing synchronization information, and the second message is addressed to a second peripheral device of the peripheral device pair.

In a second aspect, process 1000 includes transmitting the user data to the AP, and the user data is addressed to the peripheral device.

In a third aspect, the user data includes audio data that is associated with an audio frame that is based at least in part on the WCD TSF_soft.

In a fourth aspect, the timing synchronization information includes at least one of a clock drift metric that is based at least in part on the WCD TSF_soft and the TSF_AP, or a clock offset metric that is based at least in part on the WCD TSF_soft and the TSF_AP.

In a fifth aspect, process 1000 includes performing an XPAN synchronization procedure with the peripheral device, and the timing synchronization information is based at least in part on the synchronization procedure.

In a sixth aspect, performing the synchronization procedure includes transmitting, to the AP, an XPAN synchronization message that is addressed to the peripheral device, and receiving, from the AP, an XPAN synchronization response message that indicates that the peripheral device is a source of the XPAN synchronization response message.

In a seventh aspect, transmitting the timing synchronization information includes transmitting, to the AP, an XPAN synchronization time message that is addressed to the peripheral device.

In an eighth aspect, process 1000 includes calculating the timing synchronization information based at least in part on RTT information associated with the XPAN synchronization message and the XPAN synchronization response message.

In a ninth aspect, performing the XPAN synchronization procedure includes disabling a power saving mode at the WCD.

In a tenth aspect, process 1000 includes receiving an XPAN synchronization initialization message, disabling a power saving mode at the WCD, performing an XPAN synchronization procedure that is based at least in part on the peripheral device, and calculating the timing synchronization information based at least in part on the XPAN synchronization procedure.

In an eleventh aspect, the AP is a second AP, and process 1000 includes determining that the peripheral device is connected to a first AP that is different from the second AP, and determining to perform the XPAN synchronization procedure based at least in part on the peripheral device being connected to the first AP.

In a twelfth aspect, process 1000 includes enabling the power saving mode at the WCD based at least in part on completion of the XPAN synchronization procedure.

In a thirteenth aspect, process 1000 includes receiving an XPAN synchronization initialization message, determining that the peripheral device is connected to the AP, calculating the timing synchronization information based at least in part on the AP, and transmitting an XPAN synchronization time message that indicates the timing synchronization information.

In a fourteenth aspect, process 1000 includes transmitting a first XPAN synchronization time message that indicates the AP that is connected to the WCD, receiving an XPAN synchronization request message, calculating the timing synchronization information based at least in part on the AP, and transmitting a second XPAN synchronization time message that indicates the timing synchronization information.

In a fifteenth aspect, calculating the timing synchronization information based at least in part on the AP includes calculating at least one of a clock drift metric that is based at least in part on the AP, or a clock offset metric that is based at least in part on the AP.

In a sixteenth aspect, the AP is a second AP, the timing synchronization information is first timing synchronization information, and process 1000 includes transmitting a first XPAN synchronization time message that indicates the AP that is connected to the WCD, receiving an XPAN synchronization measure message that indicates second timing synchronization information that is based at least in part on a first AP connected to the peripheral device, calculating the first timing synchronization information based at least in part on the second timing synchronization information, and transmitting a second XPAN synchronization time message that indicates the first timing synchronization information.

In a seventeenth aspect, the AP is a second AP, and process 1000 includes transmitting a first XPAN synchronization time message that indicates the AP that is connected to the WCD, receiving an XPAN synchronization initialization message, disabling a power saving mode, performing an XPAN synchronization procedure based at least in part on receiving the XPAN synchronization initialization message, calculating the timing synchronization information based at least in part on the XPAN synchronization procedure, and transmitting an XPAN synchronization time message that indicates the timing synchronization information.

In an eighteenth aspect, process 1000 includes enabling the power saving mode based at least in part on completion of the XPAN synchronization procedure.

In a nineteenth aspect, calculating the timing synchronization information includes calculating the timing synchronization information based at least in part on RTT information associated with an XPAN synchronization message and an XPAN synchronization response message that are associated with the XPAN synchronization procedure.

In a twentieth aspect, calculating the timing synchronization information includes calculating the timing synchronization information based at least in part on using respective timing synchronization information associated with each peripheral device of multiple peripheral devices.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
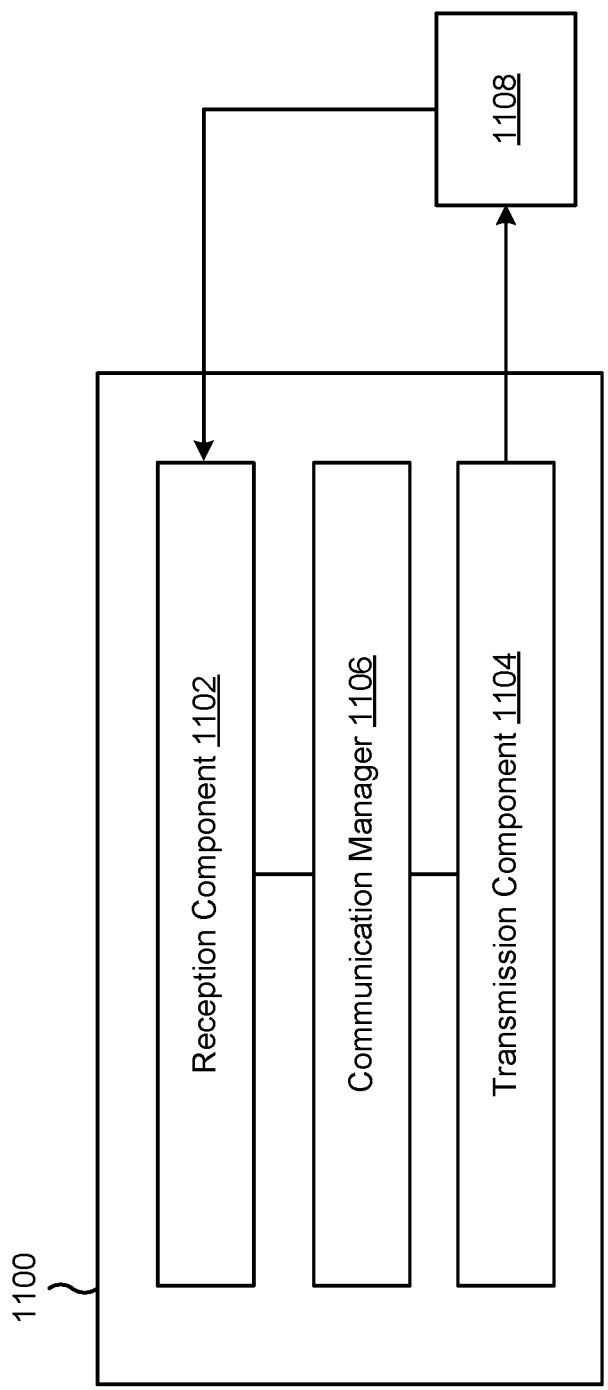
FIG. 11 is a diagram of an example apparatus for wireless communication, in accordance with the present disclosure.

FIG. 11 is a diagram of an example apparatus 1100 for wireless communication, in accordance with the present disclosure. In some aspects, the apparatus 1100 may be a peripheral device, or a peripheral device may include the apparatus 1100. In other aspects, the apparatus 1100 may be a WCD, or a WCD may include the apparatus 1100. As shown by FIG. 11, the apparatus 1100 may include a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a device 115 (e.g., a WCD), an AP 105, and/or a peripheral device (e.g., another device 115, a wireless earbud 130-*a*, and/or a wireless earbud 130-*b*), using the reception component 1102 and the transmission component 1104.

In some aspects, the apparatus 1100 may be configured to perform one or more operations described herein in connection with FIGS. 2-10. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the device 1200 described in connection with FIG. 12. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a multiple-input-multiple-output (MIMO) detector, a receive processor, a controller/processor, a memory, or a combination thereof, of the peripheral device described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the peripheral device described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

As described above, the apparatus 1100 may be a peripheral device, or a peripheral device may include the apparatus 1100. In some aspects, the communication manager 1106 may synchronize a local clock to a TSF_AP that is maintained by an AP connected to the peripheral device. The communication manager 1106 may maintain, based at least in part on the local clock, a TSF_est that is associated with outputting user data. The reception component 1102 may receive, from the AP, timing synchronization information that is based at least in part on a comparison between a WCD TSF_soft and the TSF_est. The transmission component 1104 may output the user data based at least in part on the TSF_est and the timing synchronization information.

The communication manager 1106 may convert an audio frame timing reference that is based at least in part on the WCD TSF_soft to a local audio frame timing reference that is based at least in part on the TSF_est and the timing synchronization information. Alternatively, or additionally, the communication manager 1106 may perform an XPAN synchronization procedure with a WCD, and the timing synchronization information is based at least in part on the synchronization procedure.

The communication manager 1106 may transmit, by way of the transmission component 1104, an XPAN synchronization initialization message. In some aspects, the communication manager 1106 may disable a power saving mode (e.g., based at least in part on transmitting the XPAN synchronization initialization message). The communication manager 1106 may perform an XPAN synchronization procedure that is based at least in part on the WCD (e.g., an XPAN synchronization procedure associated with transmitting a message to and/or receiving a message from the WCD), and the timing synchronization information is based at least in part on the XPAN synchronization procedure. In some aspects, the communication manager 1106 may enable the power saving mode based at least in part on completion of the XPAN synchronization procedure. The communication manager 1106 may receive, by way of the reception component 1102, an XPAN synchronization time message that indicates timing synchronization information. Based at least in part on receiving the XPAN synchronization time message, the communication manager 1106 may enable the power saving mode.

The communication manager 1106 may receive, by way of the reception component 1102, an indication that the WCD is connected to the AP connected to the apparatus 1100. Based at least in part on the WCD being connected to the AP connected to the apparatus 1100, the communication manager 1106 may disable a power saving mode. Alternatively, or additionally, and based at least in part on the WCD being connected to the AP connected to the apparatus 1100, the communication manager 1106 may transmit, by way of the transmission component 1104, an XPAN synchronization request message. In some aspects, the communication manager 1106 may receive, by way of the reception component 1102, an XPAN synchronization time message that indicates the timing synchronization information.

In some aspects, the apparatus 1100 may be implemented by a WCD (e.g., a device 115, a device 1200, a WCD 402, a WCD 602, WCD 702, and/or WCD 802). Accordingly, the communication manager 1106 may maintain a WCD TSF_soft that is associated with outputting user data at a peripheral device. The communication manager 1106 may calculate timing synchronization information that is associated with synchronizing the WCD TSF_soft and a TSF_est that is local to the peripheral device. The transmission component 1104 may transmit, to an AP, a message that indicates the timing synchronization information and is addressed to the peripheral device. The transmission component 1104 may transmit the user data to the AP, and the user data is addressed to the peripheral device.

The communication manager 1106 may perform an XPAN synchronization procedure with the peripheral device, and the timing synchronization information is based at least in part on the synchronization procedure. In some aspects, the communication manager 1106 may calculate the timing synchronization information based at least in part on RTT information associated with performing the XPAN synchronization procedure. In some aspects, the XPAN synchronization procedure includes transmitting an XPAN synchronization message and receiving an XPAN synchronization response message.

The communication manager 1106 may receive, by way of the reception component 1102, an XPAN synchronization initialization message. Based at least in part on receiving the XPAN synchronization initialization message, the communication manager 1106 may disable a power saving mode at the WCD. In some aspects, the communication manager 1106 may perform an XPAN synchronization procedure that is based at least in part on a peripheral device (e.g., communicating with the peripheral device). The communication manager 1106 may perform the XPAN synchronization procedure based at least in part on disabling the power saving mode. The communication manager 1106 may calculate the timing synchronization information based at least in part on the XPAN synchronization procedure and/or the communication manager 1106 may enable the power saving mode at the WCD based at least in part on completion of the XPAN synchronization procedure.

The communication manager 1106 may receive, by way of the reception component 1102, an XPAN synchronization initialization message. Based at least in part on receiving the XPAN synchronization initialization message, the communication manager 1106 may determine that the peripheral device is connected to the AP and/or the communication manager 1106 may calculate the timing synchronization information based at least in part on the AP. The communication manager 1106 may transmit, by way of the transmission component 1104, an XPAN synchronization time message that indicates the timing synchronization information.

The communication manager 1106 may transmit, by way of the transmission component 1104, a first XPAN synchronization time message that indicates the AP that is connected to the WCD. The communication 1106 may receive, by way of the reception component 1102, an XPAN synchronization request message. In some aspects, the communication manager 1106 may calculate the timing synchronization information based at least in part on the AP and/or based at least in part on receiving the XPAN synchronization request message. The communication manager 1106 may transmit, by way of the transmission component 1104, a second XPAN synchronization time message that indicates the timing synchronization information. In some aspects, the communication manager 1106 may enable the power saving mode based at least in part on completion of an XPAN synchronization procedure.

The communication manager 1106 may disconnect from a first AP that is associated with a first TSF_AP, and connect to a second AP that is associated with a second TSF_AP. The communication manager 1106 may synchronize the local TSF to the second TSF_AP and maintain a second TSF_est based at least in part on the second TSF_AP. The communication manager 1106 may output the user data based at least in part on the second TSF_est.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
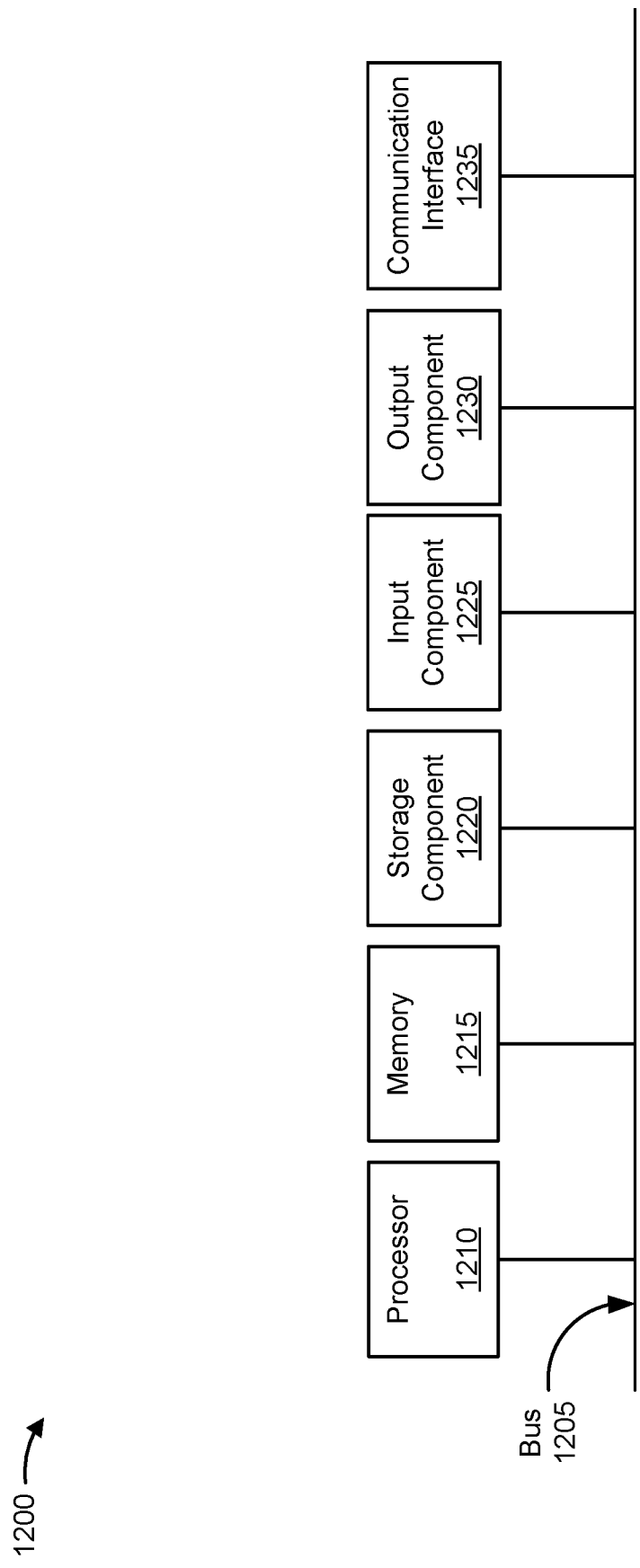
FIG. 12 is a diagram illustrating example components of a device, in accordance with the present disclosure.

FIG. 12 is a diagram illustrating example components of a device 1200, in accordance with the present disclosure. Device 1200 may correspond to a first device (e.g., a first device 115 and/or a WCD) and/or a second device (e.g., a second device 115 and/or a peripheral device). In some aspects, the first wireless communication device and/or the second wireless communication device may include one or more devices 1200 and/or one or more components of device 1200. As shown in FIG. 12, device 1200 may include a bus 1205, a processor 1210, a memory 1215, a storage component 1220, an input component 1225, an output component 1230, and/or a communication interface 1235.

Bus 1205 includes a component that permits communication among the components of device 1200. Processor 1210 is implemented in hardware, firmware, or a combination of hardware and software. Processor 1210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 1210 includes one or more processors capable of being programmed to perform a function. Memory 1215 includes a random access memory (RAM), a read only memory (ROM), and/or another type of dynamic or static storage device (e.g., a flash memory, a magnetic memory, and/or an optical memory) that stores information and/or instructions for use by processor 1210.

Storage component 1220 stores information and/or software related to the operation and use of device 1200. For example, storage component 1220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1225 includes a component that permits device 1200 to receive information, such as via user input (e.g., a touch screen display, a keyboard, a keypad, a mouse, a button, a switch, and/or a microphone). Additionally, or alternatively, input component 1225 may include a component for determining a position or a location of device 1200 (e.g., a global positioning system (GPS) component or a global navigation satellite system (GNSS) component) and/or a sensor for sensing information (e.g., an accelerometer, a gyroscope, an actuator, or another type of position or environment sensor). Output component 1230 includes a component that provides output information from device 1200 (e.g., a display, a speaker, a haptic feedback component, and/or an audio or visual indicator).

Communication interface 1235 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1235 may permit device 1200 to receive information from another device and/or provide information to another device. For example, communication interface 1235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

Device 1200 may perform one or more processes described herein. Device 1200 may perform these processes based on processor 1210 executing software instructions stored by a non-transitory computer-readable medium, such as memory 1215 and/or storage component 1220. A computer-readable medium is defined herein as a non-transitory memory device. A memory device includes memory space within a single physical storage device or memory space spread across multiple physical storage devices.

Software instructions may be read into memory 1215 and/or storage component 1220 from another computer-readable medium or from another device via communication interface 1235. When executed, software instructions stored in memory 1215 and/or storage component 1220 may cause processor 1210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, a device 1200 (e.g., a device 115, a wireless earbud 130-*a*, and/or a wireless earbud 130-*b*) includes means for synchronizing a local clock to a TSF_AP that is maintained by an AP connected to the peripheral device; means for maintaining, based at least in part on the local clock, a TSF_est that is associated with outputting user data; means for receiving, from the AP, timing synchronization information that is based at least in part on a comparison between a WCD TSF_soft and the TSF_est; and/or means for outputting the user data based at least in part on the TSF_est and the timing synchronization information.

In some aspects, a device 1200 includes means for maintaining a WCD TSF_soft that is associated with outputting user data at a peripheral device; means for calculating timing synchronization information that is associated with synchronizing the WCD TSF_soft and a TSF_est that is local to the peripheral device; and/or means for transmitting, to an AP, a message that indicates the timing synchronization information and is addressed to the peripheral device.

In some aspects, the means for the device 1200 to perform operations described herein may include, for example, one or more of communication manager 140, processor 1210, memory 1215, storage component 1220, input component 1225, output component 1230, and/or communication interface 1235.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

The following provides an overview of some Aspects of the present disclosure:

Aspect 1: A method of wireless communication performed by a peripheral device, comprising: synchronizing a local clock to an access point timing synchronization function clock (TSF_AP) that is maintained by an access point (AP) connected to the peripheral device; maintaining, based at least in part on the local clock, an estimated time-to-play timing synchronization function clock (TSF_est) that is associated with outputting user data; receiving, from the AP, timing synchronization information that is based at least in part on a comparison between a wireless communication device (WCD) time-to-play timing synchronization function software clock (TSF_soft) and the TSF_est; and outputting the user data based at least in part on the TSF_est and the timing synchronization information.

Aspect 2: The method of Aspect 1, wherein the user data comprises audio data that is associated with an audio frame that is based at least in part on the WCD TSF_soft.

Aspect 3: The method of any of Aspects 1-2, wherein the peripheral device is a first peripheral device included in a peripheral device pair that includes a second peripheral device, and the method further comprises: using the TSF_AP as a common network clock that is shared with the second peripheral device.

Aspect 4: The method of Aspect 3, wherein using the TSF_AP as the common network clock further comprises: refraining from performing a synchronization procedure with the second peripheral device.

Aspect 5: The method of Aspect 3, wherein using the TSF_AP as the common network clock further comprises: maintaining synchronization with the second peripheral device based at least in part on the TSF_AP.

Aspect 6: The method of any of Aspects 1-5, wherein the timing synchronization information comprises at least one of: a clock drift metric that is based at least in part on the WCD TSF_soft and the TSF_AP, or a clock offset metric that is based at least in part on the WCD TSF_soft and the TSF_AP.

Aspect 7: The method of any of Aspects 1-6, further comprising: converting an audio frame timing reference that is based at least in part on the WCD TSF_soft to a local audio frame timing reference that is based at least in part on the TSF_est and the timing synchronization information, wherein outputting the user data based at least in part on the TSF_est and the timing synchronization information comprises: outputting the user data based at least in part on the local audio frame timing reference, wherein outputting the user data based at least in part on the TSF_est and the timing synchronization information comprises: outputting the user data based at least in part on the local audio frame timing reference.

Aspect 8: The method of any of Aspects 1-7, further comprising: performing an extended personal area network (XPAN) synchronization procedure with the WCD, wherein the timing synchronization information is based at least in part on the synchronization procedure.

Aspect 9: The method of Aspect 8, wherein performing the synchronization procedure comprises: receiving, from the AP, an XPAN synchronization message that indicates that the WCD is a source of the XPAN synchronization message; and transmitting, to the AP, an XPAN synchronization response message that is addressed to the WCD.

Aspect 10: The method of Aspect 9, wherein receiving the timing synchronization information further comprises: receiving, from the AP, an XPAN synchronization time message.

Aspect 11: The method of any of Aspects 1-10, further comprising: transmitting an extended personal area network (XPAN) synchronization initialization message; disabling a power saving mode; and performing an XPAN synchronization procedure that is based at least in part on the WCD, wherein the timing synchronization information is based at least in part on the XPAN synchronization procedure.

Aspect 12: The method of Aspect 11, wherein the peripheral device is a first peripheral device in a peripheral device pair, and the method further comprises: performing a clock smoothing procedure based at least in part on communicating with a second peripheral device in the peripheral device pair.

Aspect 13: The method of Aspect 11, further comprising: enabling the power saving mode based at least in part on completion of the XPAN synchronization procedure.

Aspect 14: The method of any of Aspects 1-13, further comprising: transmitting an extended personal area network (XPAN) synchronization initialization message; disabling a power saving mode; receiving an XPAN synchronization time message that indicates the timing synchronization information; and enabling the power saving mode.

Aspect 15: The method of any of Aspects 1-14, further comprising: receiving an indication that the WCD is connected to the AP connected to the peripheral device; disabling a power saving mode; transmitting an extended personal area network (XPAN) synchronization request message; and receiving an XPAN synchronization time message that indicates the timing synchronization information.

Aspect 16: The method of Aspect 15, wherein the XPAN synchronization time message is a second XPAN synchronization time message, and wherein receiving the indication that the WCD is connected to the AP connected to the peripheral device comprises: receiving, prior to receiving the second XPAN synchronization time message, a first XPAN synchronization time message that indicates that the WCD is connected to the AP connected to the peripheral device.

Aspect 17: The method of any of Aspects 1-16, wherein the AP is a first AP, wherein the timing synchronization information is first timing synchronization information, and the method further comprises: receiving an indication that the WCD is connected to a second AP that is different from the first AP; calculating second timing synchronization information that is based at least in part on the peripheral device and the first AP; transmitting an extended personal area network (XPAN) synchronization measure message that indicates the second timing synchronization information; and receiving an XPAN synchronization time message that indicates the first timing synchronization information.

Aspect 18: The method of Aspect 17, wherein calculating the second timing synchronization information is based at least in part on the TSF_est being initialized.

Aspect 19: The method of any of Aspects 1-18, wherein the AP is a first AP, and the method further comprises: receiving, prior to initialization of the TSF_est, an indication that the WCD is connected to a second AP that is different from the first AP; transmitting an extended personal area network (XPAN) synchronization initialization message based at least in part on TSF_est being uninitialized; disabling a power saving mode; performing an XPAN synchronization procedure; receiving an XPAN synchronization time message that indicates the timing synchronization information; and enabling the power saving mode.

Aspect 20: The method of any of Aspects 1-19, wherein the AP is a first AP, wherein the TSF_AP is a first TSF_AP, the TSF_est is a first TSF_est, and the method further comprises: disconnecting from the first AP; connecting to a second AP that is associated with a second TSF_AP; synchronizing the local TSF to the second TSF_AP; maintaining a second TSF_est based at least in part on the second TSF_AP; and outputting the user data based at least in part on the second TSF_est.

Aspect 21: The method of Aspect 20, further comprising: updating the timing synchronization information based at least in part on the second TSF_AP and the first TSF_est, wherein outputting the user data is based at least in part on the updated timing synchronization information.

Aspect 22: The method of Aspect 20, further comprising: receiving updated timing synchronization information, wherein outputting the user data is based at least in part on the updated timing synchronization information.

Aspect 23: A method of wireless communication performed by a wireless communication device (WCD), comprising: maintaining a WCD time-to-play timing synchronization function software clock (TSF_soft) that is associated with outputting user data at a peripheral device; calculating timing synchronization information that is associated with synchronizing the WCD TSF_soft and an estimated time-to-play timing synchronization function clock (TSF_est) that is local to the peripheral device; and transmitting, to an access point (AP), a message that indicates the timing synchronization information and is addressed to the peripheral device.

Aspect 24: The method of Aspect 23, wherein the peripheral device is a first peripheral device in a peripheral device pair, the message is a first message, and the method further comprises: transmitting, to the AP, a second message that indicates the timing synchronization information, wherein the second message is addressed to a second peripheral device of the peripheral device pair.

Aspect 25: The method of any of Aspects 23-24, further comprising: transmitting the user data to the AP, wherein the user data is addressed to the peripheral device.

Aspect 26: The method of Aspect 25, wherein the user data comprises audio data that is associated with an audio frame that is based at least in part on the WCD TSF_soft.

Aspect 27: The method of any of Aspects 23-26, wherein the timing synchronization information comprises at least one of: a clock drift metric that is based at least in part on the WCD TSF_soft and the TSF_AP, or a clock offset metric that is based at least in part on the WCD TSF_soft and the TSF_AP.

Aspect 28: The method of any of Aspects 23-27, further comprising: performing an extended personal area network (XPAN) synchronization procedure with the peripheral device, wherein the timing synchronization information is based at least in part on the synchronization procedure.

Aspect 29: The method of Aspect 28, wherein performing the synchronization procedure comprises: transmitting, to the AP, an XPAN synchronization message that is addressed to the peripheral device; and receiving, from the AP, an XPAN synchronization response message that indicates that the peripheral device is a source of the XPAN synchronization response message.

Aspect 30: The method of Aspect 29, wherein transmitting the timing synchronization information further comprises: transmitting, to the AP, an XPAN synchronization time message that is addressed to the peripheral device.

Aspect 31: The method of Aspect 29, further comprising: calculating the timing synchronization information based at least in part on round-trip-time (RTT) information associated with the XPAN synchronization message and the XPAN synchronization response message.

Aspect 32: The method of Aspect 28, wherein performing the XPAN synchronization procedure further comprises: disabling a power saving mode at the WCD.

Aspect 33: The method of any of Aspects 23-29, further comprising: receiving an extended personal area network (XPAN) synchronization initialization message; disabling a power saving mode at the WCD; performing an XPAN synchronization procedure that is based at least in part on the peripheral device; and calculating the timing synchronization information based at least in part on the XPAN synchronization procedure.

Aspect 34: The method of Aspect 33, wherein the AP is a second AP, and wherein the method further comprises: determining that the peripheral device is connected to a first AP that is different from the second AP; and determining to perform the XPAN synchronization procedure based at least in part on the peripheral device being connected to the first AP.

Aspect 35: The method of Aspect 33, further comprising: enabling the power saving mode at the WCD based at least in part on completion of the XPAN synchronization procedure.

Aspect 36: The method of any of Aspects 23-35, further comprising: receiving an extended personal area network (XPAN) synchronization initialization message; determining that the peripheral device is connected to the AP; calculating the timing synchronization information based at least in part on the AP; and transmitting an XPAN synchronization time message that indicates the timing synchronization information.

Aspect 37: The method of any of Aspects 23-36, further comprising: transmitting a first extended personal area network (XPAN) synchronization time message that indicates the AP that is connected to the WCD; receiving an XPAN synchronization request message; calculating the timing synchronization information based at least in part on the AP; and transmitting a second XPAN synchronization time message that indicates the timing synchronization information.

Aspect 38: The method of Aspect 37, wherein calculating the timing synchronization information based at least in part on the AP comprises: calculating at least one of: a clock drift metric that is based at least in part on the AP, or a clock offset metric that is based at least in part on the AP.

Aspect 39: The method of any of Aspects 23-38, wherein the AP is a second AP, wherein the timing synchronization information is first timing synchronization information, and the method further comprises: transmitting a first extended personal area network (XPAN) synchronization time message that indicates the AP that is connected to the WCD; receiving an XPAN synchronization measure message that indicates second timing synchronization information that is based at least in part on a first AP connected to the peripheral device; calculating the first timing synchronization information based at least in part on the second timing synchronization information; and transmitting a second XPAN synchronization time message that indicates the first timing synchronization information.

Aspect 40: The method of any of Aspects 23-39, wherein the AP is a second AP, and the method further comprises: transmitting a first extended personal area network (XPAN) synchronization time message that indicates the AP that is connected to the WCD; receiving an XPAN synchronization initialization message; disabling a power saving mode; performing an XPAN synchronization procedure based at least in part on receiving the XPAN synchronization initialization message; calculating the timing synchronization information based at least in part on the XPAN synchronization procedure; and transmitting an XPAN synchronization time message that indicates the timing synchronization information.

Aspect 41: The method of Aspect 40, further comprising: enabling the power saving mode based at least in part on completion of the XPAN synchronization procedure.

Aspect 42: The method of Aspect 40, wherein calculating the timing synchronization information comprises: calculating the timing synchronization information based at least in part on round-trip-time (RTT) information associated with an XPAN synchronization message and an XPAN synchronization response message that are associated with the XPAN synchronization procedure.

Aspect 43: The method of Aspect 40, wherein calculating the timing synchronization information comprises: calculating the timing synchronization information based at least in part on using respective timing synchronization information associated with each peripheral device of multiple peripheral devices.

Aspect 44: An apparatus for wireless communication at a device, comprising a processor; memory coupled with the processor; and instructions stored in the memory and executable by the processor to cause the apparatus to perform the method of one or more of Aspects 1-22.

Aspect 45: An apparatus for wireless communication at a device, comprising a processor; memory coupled with the processor; and instructions stored in the memory and executable by the processor to cause the apparatus to perform the method of one or more of Aspects 23-43.

Aspect 46: A device for wireless communication, comprising a memory and one or more processors coupled to the memory, the one or more processors configured to perform the method of one or more of Aspects 1-22.

Aspect 47: A device for wireless communication, comprising a memory and one or more processors coupled to the memory, the one or more processors configured to perform the method of one or more of Aspects 23-43.

Aspect 48: An apparatus for wireless communication, comprising at least one means for performing the method of one or more of Aspects 1-22.

Aspect 49: An apparatus for wireless communication, comprising at least one means for performing the method of one or more of Aspects 23-43.

Aspect 50: A non-transitory computer-readable medium storing code for wireless communication, the code comprising instructions executable by a processor to perform the method of one or more of Aspects 1-22.

Aspect 51: A non-transitory computer-readable medium storing code for wireless communication, the code comprising instructions executable by a processor to perform the method of one or more of Aspects 23-43.

Aspect 52: A non-transitory computer-readable medium storing a set of instructions for wireless communication, the set of instructions comprising one or more instructions that, when executed by one or more processors of a device, cause the device to perform the method of one or more of Aspects 1-22.

Aspect 53: A non-transitory computer-readable medium storing a set of instructions for wireless communication, the set of instructions comprising one or more instructions that, when executed by one or more processors of a device, cause the device to perform the method of one or more of Aspects 23-43.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a peripheral device, comprising:
   one or more memories; and
   one or more processors, coupled to the one or more memories, configured, individually or collectively, to:
   synchronize a local clock to an access point timing synchronization function clock (TSF_AP) that is maintained by an access point (AP) connected to the peripheral device;
   maintain, based at least in part on the local clock, an estimated time-to-play timing synchronization function clock (TSF_est) that is associated with outputting user data;
   receive, from the AP, timing synchronization information that is based at least in part on a comparison between a wireless communication device (WCD) time-to-play timing synchronization function software clock (TSF_soft) and the TSF_est; and
   output the user data based at least in part on the TSF_est and the timing synchronization information.

2. The apparatus of claim 1, wherein the user data comprises audio data that is associated with an audio frame that is based at least in part on the WCD TSF_soft.

3. The apparatus of claim 1, wherein the peripheral device is a first peripheral device included in a peripheral device pair that includes a second peripheral device, and
   wherein the one or more processors are further configured to:
   use the TSF_AP as a common network clock that is shared with the second peripheral device.

4. The apparatus of claim 1, wherein the timing synchronization information comprises at least one of:
   a clock drift metric that is based at least in part on the WCD TSF_soft and the TSF_AP, or
   a clock offset metric that is based at least in part on the WCD TSF_soft and the TSF_AP.

5. The apparatus of claim 1, wherein the one or more processors are further configured to:
   convert an audio frame timing reference that is based at least in part on the WCD TSF_soft to a local audio frame timing reference that is based at least in part on the TSF_est and the timing synchronization information,
   wherein the one or more processors, to output the user data based at least in part on the TSF_est and the timing synchronization information, are configured to:
   output the user data based at least in part on the local audio frame timing reference.

6. The apparatus of claim 1, wherein the one or more processors are further configured to:
   transmit an extended personal area network (XPAN) synchronization initialization message;
   disable a power saving mode; and
   perform an XPAN synchronization procedure that is based at least in part on the WCD,
   wherein the timing synchronization information is based at least in part on the XPAN synchronization procedure.

7. The apparatus of claim 1, wherein the one or more processors are further configured to:
   transmit an extended personal area network (XPAN) synchronization initialization message;
   disable a power saving mode;
   receive an XPAN synchronization time message that indicates the timing synchronization information; and
   enable the power saving mode.

8. The apparatus of claim 1, wherein the one or more processors are further configured to:
   receive an indication that the WCD is connected to the AP connected to the peripheral device;
   disable a power saving mode;
   transmit an extended personal area network (XPAN) synchronization request message; and
   receive an XPAN synchronization time message that indicates the timing synchronization information.

9. The apparatus of claim 1, wherein the AP is a first AP, wherein the timing synchronization information is first timing synchronization information, and the one or more processors are further configured to:
   receive an indication that the WCD is connected to a second AP that is different from the first AP;

calculate second timing synchronization information that is based at least in part on the peripheral device and the first AP;
transmit an extended personal area network (XPAN) synchronization measure message that indicates the second timing synchronization information; and
receive an XPAN synchronization time message that indicates the first timing synchronization information.

10. The apparatus of claim 1, wherein the AP is a first AP, and the one or more processors are further configured to:
receive, prior to initialization of the TSF_est, an indication that the WCD is connected to a second AP that is different from the first AP;
transmit an extended personal area network (XPAN) synchronization initialization message based at least in part on TSF_est being uninitialized;
disable a power saving mode;
perform an XPAN synchronization procedure;
receive an XPAN synchronization time message that indicates the timing synchronization information; and
enable the power saving mode.

11. The apparatus of claim 1, wherein the AP is a first AP, wherein the TSF_AP is a first TSF_AP, the TSF_est is a first TSF_est, and the one or more processors are further configured to:
disconnect from the first AP;
connect to a second AP that is associated with a second TSF_AP;
synchronize the local TSF to the second TSF_AP;
maintain a second TSF_est based at least in part on the second TSF_AP; and
output the user data based at least in part on the second TSF_est.

12. An apparatus for wireless communication at a wireless communication device (WCD), comprising:
one or more memories; and
one or more processors, coupled to the one or more memories, configured, individually or collectively, to:
maintain a WCD time-to-play timing synchronization function software clock (TSF_soft) that is associated with outputting user data at a peripheral device;
calculate timing synchronization information that is associated with synchronizing the WCD TSF_soft and an estimation of the WCD TSF_soft (TSF_est) that is local to the peripheral device; and
transmit, to an access point (AP), a message that indicates the timing synchronization information and is addressed to the peripheral device.

13. The apparatus of claim 12, wherein the peripheral device is a first peripheral device in a peripheral device pair, and the one or more processors are further configured to:
transmit, to the AP, a second message that indicates the timing synchronization information,
wherein the second message is addressed to a second peripheral device of the peripheral device pair.

14. The apparatus of claim 12, wherein the one or more processors are further configured to:
transmit the user data to the AP, wherein the user data is addressed to the peripheral device.

15. The apparatus of claim 12, wherein the timing synchronization information comprises at least one of:
a clock drift metric that is based at least in part on the WCD TSF_soft and the TSF_AP, or
a clock offset metric that is based at least in part on the WCD TSF_soft and the TSF_AP.

16. The apparatus of claim 12, wherein the one or more processors are further configured to:
perform an extended personal area network (XPAN) synchronization procedure with the peripheral device, wherein the timing synchronization information is based at least in part on the synchronization procedure.

17. The apparatus of claim 16, wherein the one or more processors, to perform the synchronization procedure, are configured to:
transmit, to the AP, an XPAN synchronization message that is addressed to the peripheral device; and
receive, from the AP, an XPAN synchronization response message that indicates that the peripheral device is a source of the XPAN synchronization response message.

18. The apparatus of claim 12, wherein the one or more processors are further configured to:
receive an extended personal area network (XPAN) synchronization initialization message;
disable a power saving mode at the WCD;
perform an XPAN synchronization procedure that is based at least in part on the peripheral device; and
calculate the timing synchronization information based at least in part on the XPAN synchronization procedure.

19. The apparatus of claim 18, wherein the AP is a second AP, and the one or more processors are further configured to:
determine that the peripheral device is connected to a first AP that is different from the second AP; and
determine to perform the XPAN synchronization procedure based at least in part on the peripheral device being connected to the first AP.

20. The apparatus of claim 12, wherein the one or more processors are further configured to:
receive an extended personal area network (XPAN) synchronization initialization message;
determine that the peripheral device is connected to the AP;
calculate the timing synchronization information based at least in part on the AP; and
transmit an XPAN synchronization time message that indicates the timing synchronization information.

21. The apparatus of claim 12, wherein the one or more processors are further configured to:
transmit a first extended personal area network (XPAN) synchronization time message that indicates the AP that is connected to the WCD;
receive an XPAN synchronization request message;
calculate the timing synchronization information based at least in part on the AP; and
transmit a second XPAN synchronization time message that indicates the timing synchronization information.

22. The apparatus of claim 12, wherein the AP is a second AP, wherein the timing synchronization information is first timing synchronization information, and the one or more processors are further configured to:
transmit a first extended personal area network (XPAN) synchronization time message that indicates the AP that is connected to the WCD;
receive an XPAN synchronization measure message that indicates second timing synchronization information that is based at least in part on a first AP connected to the peripheral device;
calculate the first timing synchronization information based at least in part on the second timing synchronization information; and
transmit a second XPAN synchronization time message that indicates the first timing synchronization information.

23. The apparatus of claim 12, wherein the one or more processors are further configured to:
- transmit a first extended personal area network (XPAN) synchronization time message that indicates the AP that is connected to the WCD;
- receive an XPAN synchronization initialization message;
- disable a power saving mode;
- perform an XPAN synchronization procedure based at least in part on receiving the XPAN synchronization initialization message;
- calculate the timing synchronization information based at least in part on the XPAN synchronization procedure; and
- transmit an XPAN synchronization time message that indicates the timing synchronization information.

24. A method of wireless communication performed by a peripheral device, comprising:
- synchronizing a local clock to an access point timing synchronization function clock (TSF_AP) that is maintained by an access point (AP) connected to the peripheral device;
- maintaining, based at least in part on the local clock, an estimated time-to-play timing synchronization function clock (TSF_est) that is associated with outputting user data;
- receiving, from the AP, timing synchronization information that is based at least in part on a comparison between a wireless communication device (WCD) timing synchronization function software clock (TSF_soft) and the TSF_est; and
- outputting the user data based at least in part on the TSF_est and the timing synchronization information.

25. The method of claim 24, wherein the peripheral device is a first peripheral device included in a peripheral device pair that includes a second peripheral device, and the method further comprises:
- using the TSF_AP as a common network clock that is shared with the second peripheral device.

26. The method of claim 24, further comprising:
- performing an extended personal area network (XPAN) synchronization procedure with the WCD, wherein the timing synchronization information is based at least in part on the synchronization procedure.

27. The method of claim 24, wherein the AP is a first AP, wherein the timing synchronization information is first timing synchronization information, and the method further comprises:
- receiving an indication that the WCD is connected to a second AP that is different from the first AP;
- calculating second timing synchronization information that is based at least in part on the peripheral device and the first AP;
- transmitting an extended personal area network (XPAN) synchronization measure message that indicates the second timing synchronization information; and
- receiving an XPAN synchronization time message that indicates the first timing synchronization information.

28. A method of wireless communication performed by a wireless communication device (WCD), comprising:
- maintaining a WCD time-to-play timing synchronization function software clock (TSF_soft) that is associated with outputting user data at a peripheral device;
- calculating timing synchronization information that is associated with synchronizing the WCD TSF_soft and an estimation of the WCD TSF_soft (TSF_est) that is local to the peripheral device; and
- transmitting, to an access point (AP), a message that indicates the timing synchronization information and is addressed to the peripheral device.

29. The method of claim 28, further comprising:
- performing an extended personal area network (XPAN) synchronization procedure with the peripheral device, wherein the timing synchronization information is based at least in part on the synchronization procedure.

30. The method of claim 28, wherein calculating the timing synchronization information comprises:
- calculating the timing synchronization information based at least in part on respective timing synchronization information associated with a respective peripheral device of multiple peripheral devices.

* * * * *